US006196896B1

(12) United States Patent
Sommer

(10) Patent No.: US 6,196,896 B1
(45) Date of Patent: Mar. 6, 2001

(54) CHEMICAL MECHANICAL POLISHER

(75) Inventor: Phillip R. Sommer, Newark, CA (US)

(73) Assignee: Obsidian, Inc., Fremont, CA (US)

( * ) Notice: Subject to any disclaimer, the term of this patent is extended or adjusted under 35 U.S.C. 154(b) by 0 days.

(21) Appl. No.: 08/961,602

(22) Filed: Oct. 31, 1997

(51) Int. Cl.[7] .................................................. B24B 47/02
(52) U.S. Cl. .................................................. 451/5; 451/14
(58) Field of Search ............................ 451/5, 41, 288, 451/287, 8, 14

(56) References Cited

U.S. PATENT DOCUMENTS

| 3,376,578 | 4/1968 | Sawyer . |
|---|---|---|
| 4,571,799 | 2/1986 | Chitayat . |
| 5,036,630 | 8/1991 | Kaanta et al. . |
| 5,184,433 | * 2/1993 | Maack .................................. 451/41 |
| 5,384,986 | 1/1995 | Hirose et al. . |
| 5,486,129 | 1/1996 | Sandhu et al. . |
| 5,522,965 | 6/1996 | Chisholm et al. . |
| 5,582,534 | 12/1996 | Shendon et al. . |
| 5,599,423 | 2/1997 | Parker et al. . |
| 5,624,299 | 4/1997 | Shendon . |
| 5,643,044 | 7/1997 | Lund . |
| 5,643,053 | 7/1997 | Shendon . |
| 5,643,056 | 7/1997 | Hirose et al. . |

FOREIGN PATENT DOCUMENTS

| 61-209838 | 9/1986 | (JP) . |
| WO 96/36459 | 11/1996 | (WO) . |

* cited by examiner

Primary Examiner—Robert A. Rose
(74) Attorney, Agent, or Firm—Thomason, Moser & Patterson

(57) ABSTRACT

A chemical mechanical polisher includes a substrate carrier and support system which employs at least one motor to drive the substrate carrier through polishing motions. An additional driver for driving at least a portion of the carrier in directions perpendicular to the motions supplied by the motor(s) is also included. A clamping flexure is provided to selectively lock the substrate carrier in a vertical position. The substrate carrier, in one embodiment is mounted to a vertical driver via a column. The column is guided by spiral flexures to prevent motion in directions normal to vertical. An air mount is provided to support the majority of the mass of the substrate carrier, so that only a small force need be applied by the additional driver for movements in the vertical direction. Another drive mechanism is also described which provides both polishing motions as well as vertical force application.

50 Claims, 12 Drawing Sheets

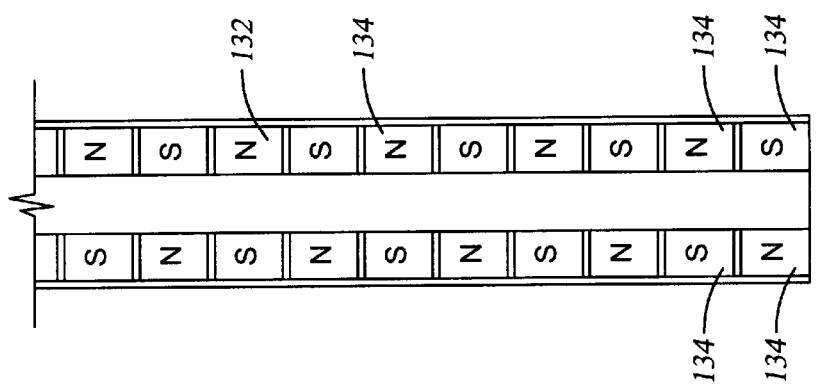
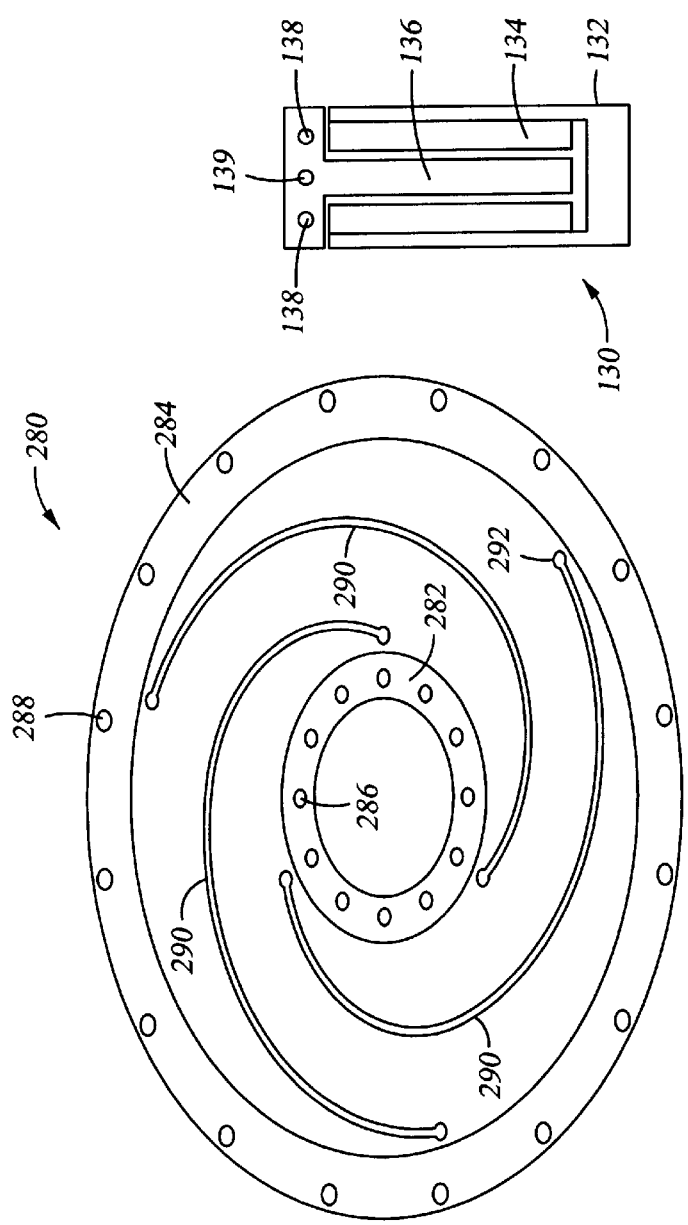

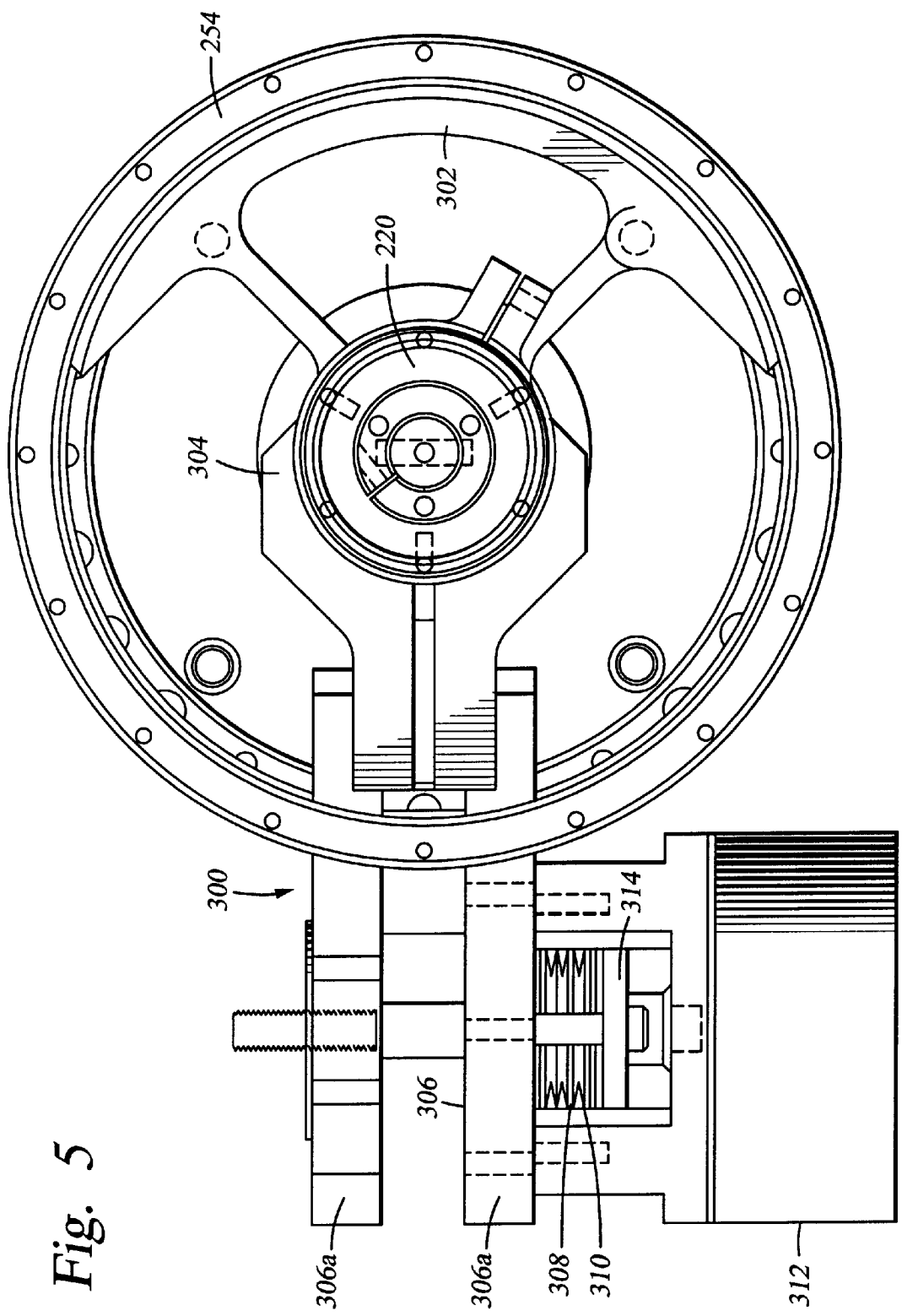

CHEMICAL MECHANICAL POLISHER

TECHNICAL FIELD

The present invention relates to chemical mechanical polishing of substrates. More specifically, improved apparatuses and methods are provided for linearly driving a substrate carrier to polish a substrate surface.

BACKGROUND ART

Chemical mechanical polishing to achieve the planarization of substrate surfaces, such as those of semiconductor wafers, flat panel displays, hard disks, etc. has become a very desirable method of processing. CMP typically requires the mounting of a substrate into a head or carrier which is then urged against a polishing surface to effect polishing of an exposed surface of the substrate. In the usual arrangements, both the carrier and the polishing surface are rotated to apply a polishing action.

For example, Kaanta et al., U.S. Pat. No. 5,036,630, discloses a method of polishing a semiconductor wafer in which a wafer carrier is coupled to a spindle which is in turn driven by a motor to rotate the spindle and wafer carrier. The wafer carrier applies a load to the wafer and against a rotatable turntable assembly which includes a polishing table that is rotatably driven by a motor.

Hirose et al., U.S. Pat. No. 5,384,986, discloses a turntable with an abrasive cloth mounted thereon and a top ring, each of which are independently rotated to perform polishing. The top ring drive shaft is rotatable about its own axis by a train of gears which are rotated by a motor.

Sandhu et al., U.S. Pat. No. 5,486,129, discloses a rotatable platen assembly which is coupled to a drive mechanism for rotation thereof. A head assembly supports and holds a face of a semiconductor wafer in contact with the platen assembly to polish the wafer face. A motor is connected to the polishing head to rotate the polishing head. Individual regions of the wafer face are disclosed as having different polishing rates.

Shendon, U.S. Pat. Nos. 5,624,299 and 5,582,534, disclose a device for chemical mechanical polishing that includes a housing which is configured to provide orbital and rotational movement of a carrier. A gear arrangement is provided to rotationally drive the carrier while at the same time sweeping the carrier arm through an orbital path. A motor and gear assembly may be connected to a platen to provide a rotational polishing surface against which the carrier moves.

The ideal substrate polishing process can be described by Preston's equation: $R=K_p*P*V$, where R is the removal rate; Kp is a function of consumables (abrasive pad roughness and elasticity, surface chemistry and abrasion effects, and contact area); P is the applied pressure between the wafer and the abrasive pad; and V is the relative velocity between the wafer and the abrasive pad. As a result, the ideal CMP process should have constant cutting velocity over the entire wafer surface, constant pressure between the abrasive pad and wafer, and constant abrasive pad roughness, elasticity, area and abrasion effects. In addition, control over the temperature and pH is critical and the direction of the relative pad/wafer velocity should be randomly distributed over the entire wafer surface.

Most of the current CMP machines, including those discussed above, fail to produce constant velocity distribution over the entire substrate surface and thereby fail to achieve uniform material removal over the entire surface which is essential for a planar result. Consequently, wastage of significant portions of the substrates results, particularly at the edges of the substrates.

Other relative motion arrangements have been attempted and described, but also fail to achieve constant velocity distribution over the entire substrate surface and thereby fail to achieve uniform material removal over the entire surface of the substrate.

Chisolm et al., U.S. Pat. No. 5,522,965, discloses a compact system for chemical mechanical polishing which employs a non-rotational platen having a polishing pad thereon, against which a wafer is rotated by a rotating carrier. An ultrasonic energy is inputted to the platen in an effort to enhance the polishing action.

Hirose et al., U.S. Pat. No. 5,643,056, discloses a revolving drum type polishing apparatus A rotating drum having a polishing pad mounted on its outer peripheral surface is provided and is rotationally driven by a motor about its longitudinal axis. The drum is suspended above a wafer to be polished by a column attached to a base. The wafer is seated on a Y-table which is in turn mounted on a X-table which is fixed to the base. The X and Y tables are able to oscillate in directions perpendicular to one another, while the drum rotates against the surface of the wafer.

Lund, U.S. Pat. No. 5,643,044, discloses an orbiting wafer carrier which is mechanically driven by an internal gear arrangement. An abrasive tape is forcibly pressed against an exposed surface of the wafer, during the orbiting motion to effect polishing.

Parker et al., U.S. Pat. No. 5,599,423, discloses an apparatus for simulating a chemical mechanical polishing system in an attempt to optimize the same. A rotating platen is provided, against which a polishing pad forces a substrate. The force is applied to the polishing pad by a moveable tubular polishing arm which is preferably continuously moved linearly across the rotating substrate, from edge to center, until the polishing end point is attained.

In addition to the failure to develop an apparatus which removes a consistent amount of material across the entire face of a substrate during polishing, most of the current machines discussed require a large mass to be born by the carrier or head support due to the mechanical arrangements which are provided for driving the carriers. This equates to a large inertial mass which must be contended with when starting and stopping a polishing motion. For rotational carriers, this is not a significant concern unless the rotational speed is to be frequently varied. However, rotational carriers have the inherent drawback of not providing a constant velocity distribution across the polishing surface.

Co-pending U.S. application Ser. No. 08/443,956, entitled "Method and Apparatus for Chemical Mechanical Polishing, discloses apparatuses which are capable of polishing a substrate while maintaining uniform average velocity between the substrate and an abrasive pad against which the substrate is polished. U.S. application Ser. No. 08/443,956 is hereby incorporated by reference thereto in its entirety.

For example, one embodiment disclosed in application Ser. No. 08/443,956 includes a carrier which is driven in the Z-direction by a servo motor and lead screw. A cross member, post and linear slide must be supported during programmable movements by the servo motor and lead screw. The carrier is maintained substantially fixed in the X and Y directions during polishing. A table, which includes the polishing surface against which the carrier polishes the substrate, is moved in the X and Y directions during polishing. The table is mounted along a linear slide and is moveable therealong in the X direction by a lead screw and servo motor arrangement. For movement in the Y-direction, a plate is provided which supports the table and is in turn mounted to another slide for movement therealong in the Y direction. The plate is driven by a third servo motor and lead screw arrangement.

While the above discussed embodiment, as well as the other embodiments disclosed in the application, effectively maintain uniform average velocity between the substrate and the abrasive pad during polishing, they nevertheless require the movements of fairly significant inertial masses to accomplish their functions. For example, in the embodiment described above, the Y-direction servo motor and lead screw must drive the combined weight of the plate and a portion of its slide, as well as the table, the table slide and the servo motor and lead screw associated with the X-direction movement of the table. This puts a significant strain on the servo motors, particularly the Y-direction servo in this example, which could lead to overheating and reduced service life of the servo and or lead screw. Even more significantly, the substantial masses involved limit the effective velocities at which the polishing patterns can be carried out.

Thus, there remains a need for systems with improved polishing velocity capabilities, which can at the same time maintain uniform average velocity between a substrate and an abrasive pad against which the substrate is polished. An important objective is to reduce the inertial mass or masses to be moved, especially for devices that include starting and stopping motions or variations in patterns and/or velocities during their operation. Another goal is to improve the performance of the drivers which actually move the inertial masses through their polishing patterns. More responsive drivers, i.e., drivers with improved acceleration and velocity capabilities, are desirable.

Additionally, mechanical arrangements for driving a carrier can limit the size of the polishing pattern that the apparatus is capable of performing. For example, the radius of the polishing path of the apparatus described in U.S. Pat. No. 5,643,053, is limited to the distance between the drive shaft 56 and the second shaft 64 which interconnect the carrier with a motor. It would be desirable to have a capability to define a polishing pattern which would be limited only by the useable surface of the polishing surface against which the carrier travels.

DISCLOSURE OF THE INVENTION

The present invention is directed to a linear drive mechanism for polishing. Preferably, the present invention is directed to a drive mechanism for chemical mechanical polishing. The mechanism includes a substrate carrier adapted to hold a substrate against a polishing surface for polishing the substrate. The substrate carrier is mounted to a support structure which is adapted to guide linear movements of the substrate carrier along two substantially perpendicular directions.

At least one linear driver is associated with the support structure, and a driver is associated with said the substrate carrier to provide a force to at least a portion of a face of the substrate carrier along a third direction substantially perpendicular to the two substantially perpendicular directions of polishing motion.

In a preferred embodiment, a base is provided upon which the support structure is movably mounted, and the support structure includes a first support stage moveable, with respect to the base, in one of two substantially perpendicular polishing directions. A second support stage is mounted on the first support stage and is moveable, with respect to the first support stage, in the other of the two substantially perpendicular directions.

Preferably, at least a first linear motor is mounted between the base and the first support stage, and at least a second linear motor is mounted between the first support stage and the second support stage. More preferably, first and third linear motors are mounted between the base and the first support stage, and second and fourth linear motors are mounted between the first support stage and the second support stage.

Additionally, at least one flex mount preferably mounts one of the first and third linear motors to the first support stage, and at least one flex mount preferably mounts one of the second and fourth linear motors to the second support stage. A column preferably interconnects the substrate carrier and the driver, and transfers a driving force from the driver to the substrate carrier, while at the same time restraining the substrate carrier from movements perpendicular to the direction of the driving force.

A position sensor, preferably an encoder or a linearly variable differential transformer, is connected to the driver to sense a position of the substrate carrier along the direction of driving force produced by the driver. The driver preferably comprises a voice coil motor and is supported by the support structure. Preferably, support arms are mounted to an exterior of the driver and supported by the support structure. Further, a support ring is preferably mounted to the support structure and connected to the support arms.

Further provided is a support apparatus interconnecting the substrate carrier with the support structure. The support apparatus includes displaceable support members connecting the substrate carrier with the support structure. A position of the substrate carrier along the third direction is adjustable by controlling a displacement of the displaceable support members. The displaceable support members also preferably support at least a portion of the mass of the driver, as well as the mass of the substrate carrier.

At least one stabilizer preferably connects the column with the support ring, to allow vertical movements of the column with respect to said support ring, and to substantially prevent movements of the column in directions perpendicular to vertical with respect to the support ring. Preferably, the stabilizer or stabilizers are spiral flexures.

A clamping flexure is preferably mounted to the support ring for releasably clamping the column. When the column is clamped, it is substantially immovable in the vertical direction, but when unclamped, the column is freely movable in the vertical direction.

In another preferred embodiment, the drive mechanism of the present invention includes a plate member and a plurality of magnets separate from the plate member and mounted to the substrate carrier. Force in the vertical direction is provided by an attractive force generated between the plurality of magnets and the plate member. The plate member includes a plurality of projections extending in rows along two substantially perpendicular directions, and are selectively energizeable to produce forces between the projections which are energized and the magnets which are aligned with the energized projections.

Further disclosed is a linear drive mechanism for polishing which includes a substrate carrier adapted to hold a substrate against a polishing surface for polishing the substrate, a support structure supporting the substrate carrier and adapted to guide linear movements of the substrate carrier along two substantially perpendicular directions, and a driver associated with the substrate carrier and supported by the support structure, to provide a driving force to the substrate carrier along a third direction substantially perpendicular to the two substantially perpendicular directions.

Still further, a linear drive mechanism for polishing is disclosed to include a substrate carrier adapted to hold a substrate against a polishing surface for polishing the substrate, a plurality of magnets mounted to the substrate carrier, and a plate member comprising a plurality of projections extending in rows along two substantially perpendicular directions. The projections are selectively energizeable to produce forces between the projections which are energized and the magnets which are aligned with the energized projections. In one embodiment, the plurality of magnets are mounted peripherally of the substantially planar face of the substrate carrier. In another embodiment, the plurality of magnets are mounted in and substantially co-planar with the substantially planar face.

A polishing pad is positioned between the substrate carrier and the plate member, such that the substrate carrier is controllable to move the substrate against the polishing pad and plate member to polish the substrate. Preferably, an interchange section is formed of a portion of the plate member, to extend beyond dimensions of the polishing pad, for interchanging/inspecting substrates. The interchange section has an opening dimensioned slightly larger than the substrate but smaller than the substrate carrier.

BRIEF DESCRIPTION OF THE DRAWINGS

FIG. 4 is a perspective view of a spiral flexure incorporated into the Z-drive of the embodiment shown in FIG. 1;

FIG. 5 is a plan view of a clamping flexure employed in the embodiment shown in FIG. 1;

FIG. 6 is an end view of a preferred embodiment of a linear motor for use in the present invention;

FIG. 7 is a top view of a fixed portion of the linear motor shown in FIG. 6;

BEST MODE FOR CARRYING OUT THE INVENTION

Figure 1:
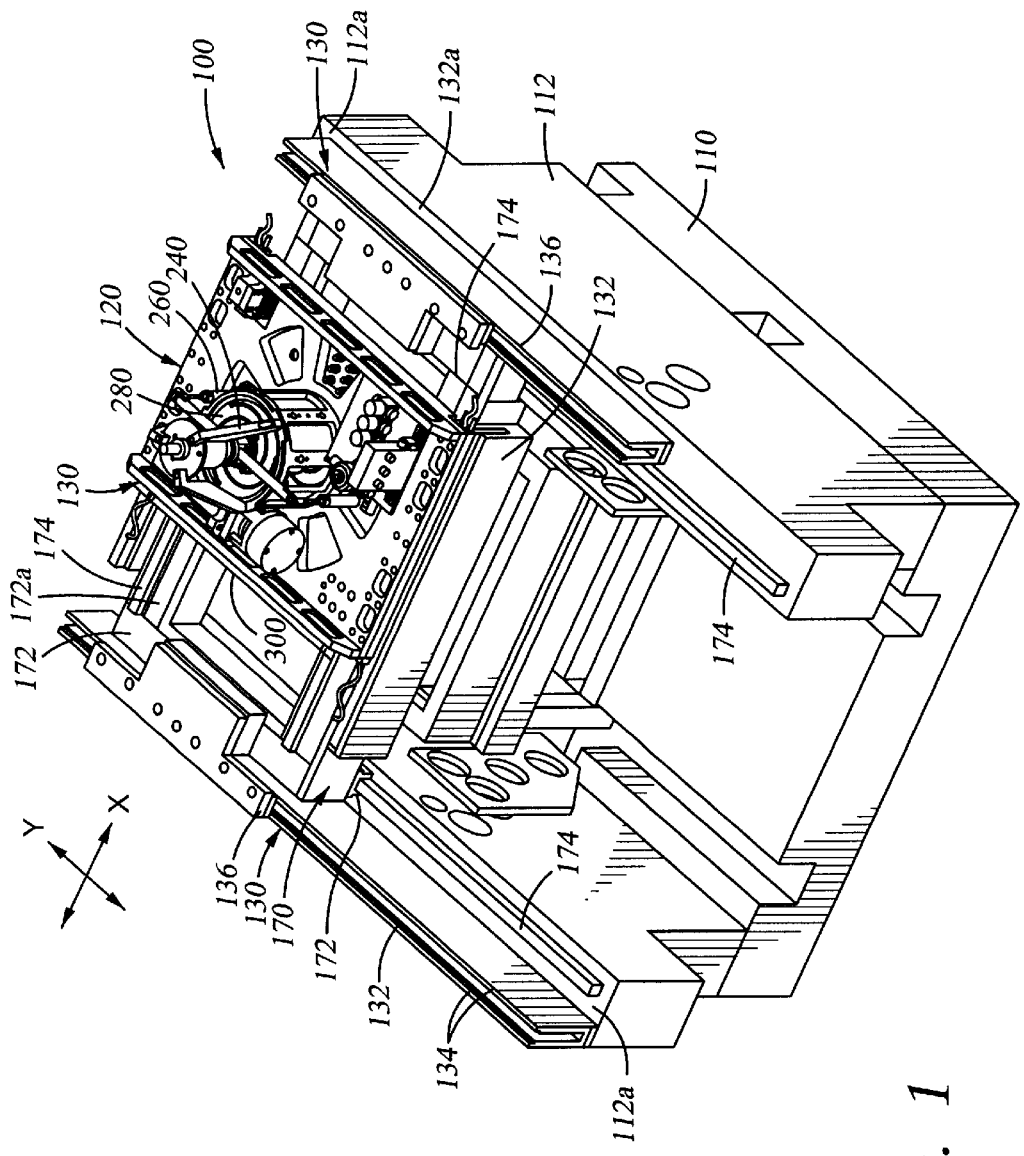
FIG. 1 is a perspective view of an apparatus employing a preferred embodiment of a linear drive mechanism according to the present invention.

Referring to FIG. 1, there is shown a perspective view of an apparatus employing a preferred embodiment of a linear drive mechanism 100 according to the present invention. A first support stage 120 is provided for movement along one substantially linear direction, i.e., the "X direction" indicated in FIG. 1. The first support stage 120 is also referred to as the X-Z stage since it supports a substrate carrier (not shown) and a driver 240 for moving the substrate carrier in a vertical or "Z" direction. The first support stage is shown in an enlarged, isolated, perspective view in FIG. 2.

A second support stage 170 is provided for substantially linear movement along the "Y direction" indicated in FIG. 1. Since the second support stage 170 supports the first support stage 120, the first support stage 120 and everything it supports are also moved in the "Y" direction when the second support stage 170 is so moved. The second support stage 170 is mounted upon supports 112 which rest upon base 110. Base 110 and supports 112 are preferably formed of a very dense, stable material, most preferably granite. Alternatively, materials such as cast aluminum, MEEHNITE (a cast iron product) polystone (ground granite mixed with a polymer epoxy) or the like may be used Underlying the second support stage 120 and the substrate carrier 102 (see FIG. 3) of the apparatus 100 is a polishing surface (not shown) against which the substrate carrier presses and moves the substrate for polishing the same. Preferably, the polishing surface is substantially immobile, although a sheet of polishing material may be incrementally or slowly and continuously moved across the polishing surface between the polishing surface and the substrate. However, a substantial polishing force or motion is generally not provided by the polishing surface. Rather, the combined linear motions of the first and second support stages 120, 170 can be programmed to form any desired polishing pattern of the substrate carrier 102 against the polishing surface. The linear drives of the apparatus are preferably computer controlled so that the operator can program the X and Y motions to move the carrier 102 in an infinite number of patterns. Additionally, because the carrier is not limited by the length of a rotary arm, the programming of the movements of the present device is not limited by any rotary arm length or radius of a mechanical part, but only by the dimensions of the entire polishing surface along which the carrier 102 may be moved by the linear drives.

In the preferred embodiment shown in FIG. 1, the second stage 170 is mounted to supports 112 via linear motors 130. Although linear motors 130 are the preferred drivers for the second stage 170 in the present invention, the present invention is not to be limited to the use of only linear motors for purposes of driving. Alternative linear drivers, such as screw drives driven by stepper motors or other motors may be employed. A "Sawyer motor" arrangement could also be employed, as described below.

The linear motors 130 each include a fixed portion 132 which comprises a pair of opposing series of permanent magnets 134, and a movable coil portion 136 which is positioned between the opposing rows of magnets 134. FIG. 6 is an end view illustrating the relationship between the fixed portion 132 and the movable coil portion 136.

The fixed portion 132 is formed to be substantially "U" shaped in cross-section, to provide a space for receiving the coil portion 136 between banks of opposing permanent magnets 134. The coil portion 136 is formed substantially as a "T" shape in cross section and is dimensioned to fit between the permanent magnets 134 without contacting them. Cooling lines 138 may optionally be provided to run the length of the coil portion 136. Air or fluids may then be circulated through cooling lines 138 to prevent overheating and a resultant reduction in performance of the linear motors. An electrical wire 139 also runs the length of the coil portion 136 for energizing the linear motor. The preferred linear motors are supplied by Anorad Corporation, Hauppauge, N.Y., although alternative linear motors could be exchanged to perform the same functions. Additionally, although a pair of linear motors is illustrated for moving each of the above-identified stages, it is noted that more than two linear motors, or even one linear motor could be arranged to provide the driving force needed for each of the respective stages. Current linear motor specifications, as well as symmetry, prefer the arrangement shown in FIG. 1 over a single linear motor arrangement, and the use of more than two linear motors per stage adds to the cost of the device.

FIG. 7 shows a top view of part of a fixed portion 132 of a linear motor 130 as employed in the present invention. The opposing banks of permanent magnets 134 run the entire length of the fixed portion 132. The polarity of the permanent magnets along each bank alternates with each adjacent magnet, as shown in FIG. 7. The polarity of each permanent magnet is also opposite that of the permanent magnet 134 on the opposite bank that opposes it.

The fixed portions 132 for driving the Y-stage 170 are mounted atop supports 112. Each of supports 112 is finished with a substantially flat and planar surface 112a which is oriented substantially horizontally level to support even controlled movements of both the Y-stage and the X-Z stage. Fixed portions 132 are mounted to surfaces 112a by way of bolts 132a, screws, or other equivalent fixation elements. The fixed portions 132 are mounted to the surfaces 112a as perfectly parallel with each other as possible and aligned with the bases 112.

Figure 3:
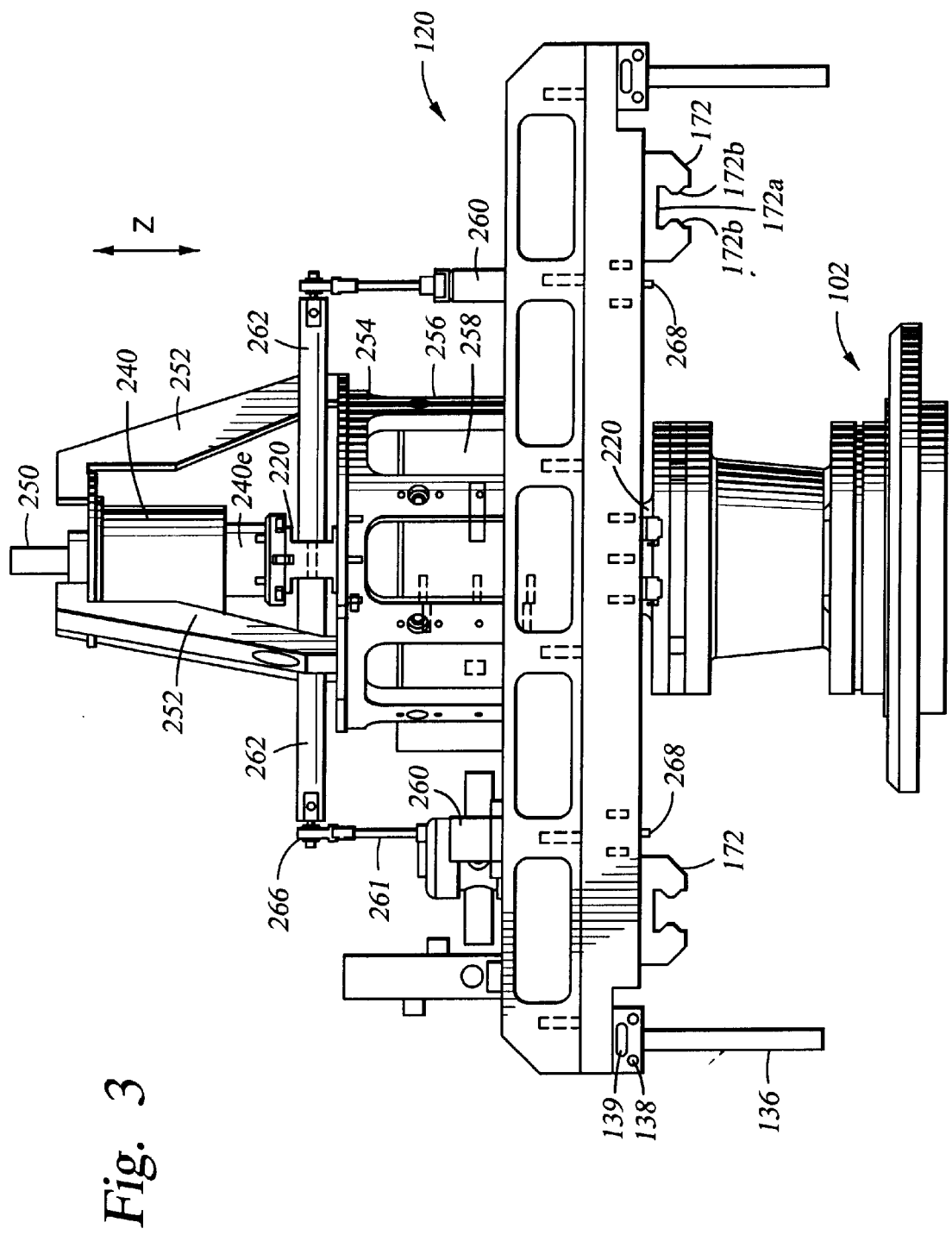
FIG. 3 is a plan view of the X-Z portion shown in FIG. 2, when viewed from the right in FIG. 2.

The Y-stage 170 is supported on the surfaces 112a by way of roller bearings (e.g., recirculation rollers) 174 which are mounted on surfaces 112a by any of the same connector elements mentioned with regard to the mounting of the fixed portions above. The roller bearings 174 run parallel with the fixed portions 132. Preferably a roller bearing strip 174 runs just inside of each of the fixed portions 132, as shown in FIG. 1. Note that part of the fixed portion 132 shown on the right side of the apparatus of FIG. 1 has been cut away so as to more clearly show the positioning of the roller bearings 174 with regard thereto. At least one bearing race 172 is mounted on the underside of the Y stage 170 for connecting the Y-stage 170 with the respective supports 112 via roller bearings 174. In this regard, each of the bearing races 172, only one of which is shown in FIG. 1 is shaped so as to conform with the outer contour of the roller bearing 174 over which it rides. A better view of the detail of a bearing race 172 is shown in FIG. 3. Although the races 172 are shown attached to the X-Z stage in FIG. 3, it is noted that the structure of these races is the same as those provided for the Y-stage and discussed above.

The bearing races 172 include a hard substantially flat and planar surface 172a which is substantially horizontal when mounted and interconnected with its respective roller bearing 174. Side ridges 172b are provided for maintaining the position of the race with respect to the roller bearings, in directions perpendicular to the direction in which the race is designed to move with respect to the roller bearings.

Either or both of the Y and X-Z stages may be provided with bearing races that extend the entire length of the respective bearings over which they ride. More preferable, however, is to provide a pair of races 172 to ride over each respective roller bearing strip 174. Thus, for example, the left side of the Y-stage 170 shown in FIG. 1 is mounted to two bearing races 174 (one of which is shown in phantom) at opposite ends of the left side of the stage 170 for movable support of the left side of the stage 170. Of course, a similar arrangement would be mounted under the right side of the stage 170 for movable support along the right side bearing strip 174.

Although the preferred embodiment shown in FIG. 1 uses roller bearings for movably supporting the respective stages to their supports for reducing friction as well as guiding the stages while they are driven by their respective linear motors, alternative reduced friction supports may be used. For example, air bearing surfaces may replace the above-described roller bearing arrangements. An example of an air bearing arrangement is disclosed in U.S. Pat. No. 4,571,799, the disclosure of which is hereby incorporated by reference in its entirety.

The coils 136 for movement of the Y-stage 170 are mounted to opposite sides of the Y-stage 170 by bolts, screws, welds or other alternative equivalent for connecting the components. As shown in the detailed FIG. 6, the coils are supported so that they touch neither the permanent magnets 134 nor the bottom surface of the "U-shape" formed by the fixed portion 132. Thus, no sliding friction is generated by movement of the coils 136 with respect to the fixed portions 132. Thus, the Y-stage 170 in FIG. 1 is supported by the bearings 174 and races 172 configured as discussed above, and the Y-stage 170, in turn, supports the coils 136 in their vertical position with respect to fixed portions 132.

Figure 8:
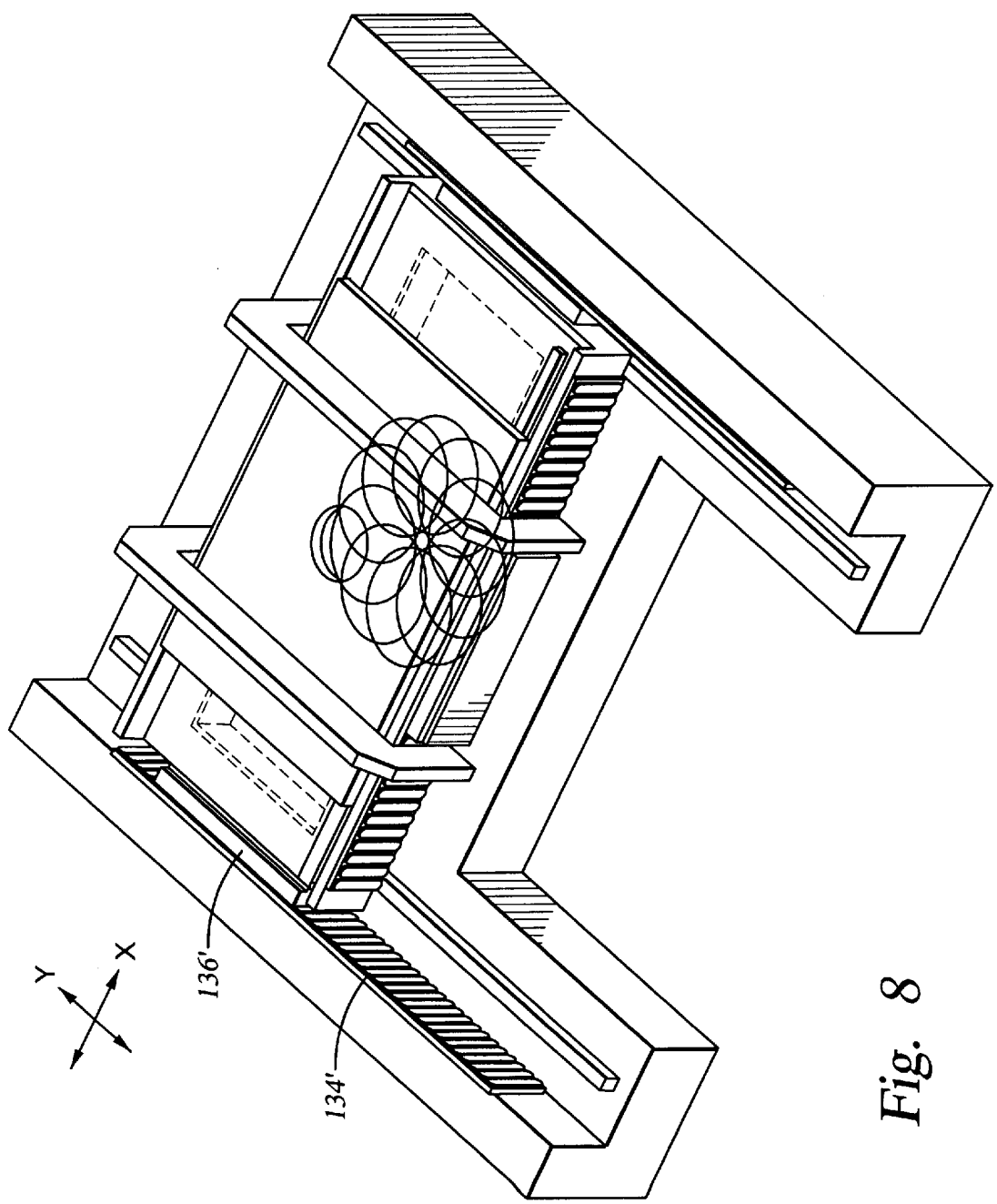
FIG. 8 is a perspective general view of an alternative embodiment employing open linear motors.

It is further noted that while the "closed-type" linear motors described above with regard to FIGS. 1, 6 and 7 are the preferred type of linear motors for use in the present application, that "open-type" linear motors, although less preferable, could also be employed in place of the "closed-type" motors. An example of open-type linear motors 130' is shown in FIG. 8. In contrast to the closed-type motors, the open-type motors have a single strip of alternating polarity permanent magnets 134' which interact with a coil 136' that is parallelly positioned to the magnets 134'. Because of the external magnetic fields generated by the open-type motor, the closedtype linear motors are preferred in the present invention.

Referring back to FIG. 1, first support stage 120 is shown mounted on top of second support stage 170. The mounting of first support stage 120 to second support stage 170 is analogous to the mounting of the second support stage 170 to supports 112, as discussed above. However, the first support stage 120 is, of course, mounted transverse to the second support stage 170, to enable movement of the first support stage 120 in the X direction shown in FIG. 1.

Figure 2:
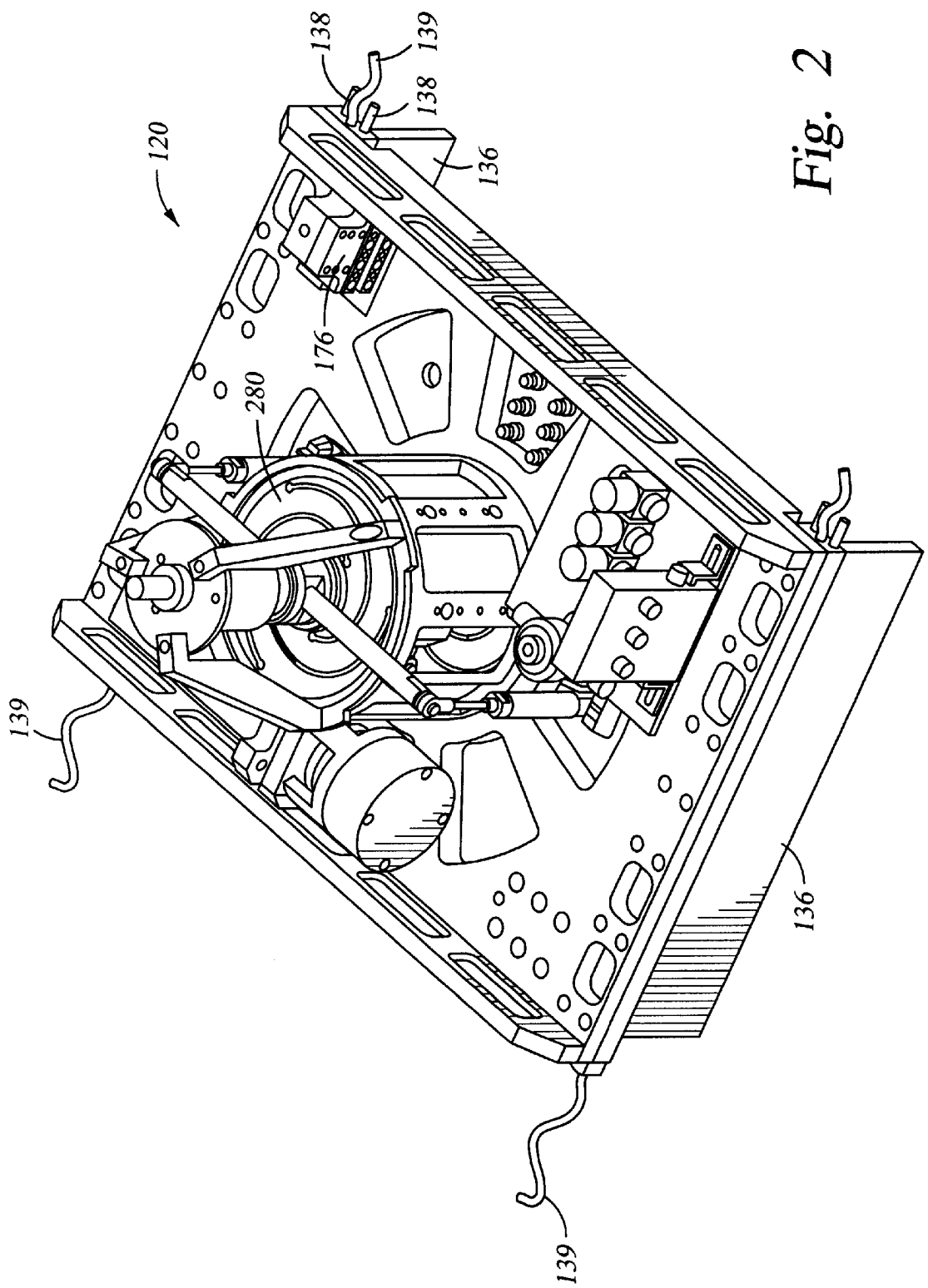
FIG. 2 is a perspective view of the X-Z portion of the linear drive mechanism shown in FIG. 1.

Thus, bearing strips 174 are mounted along the top substantially flat and planar surfaces 170a of the second support stage 170 that are oriented perpendicularly to the orientation of the linear motors 130 that drive the second support stage 170. The surfaces 170a are substantially level and horizontal upon mounting the second support stage 170 on the supports 112. A pair of fixed portions, 132 including fixed magnets 134 as described above, are mounted along the outside edges of surfaces 170a, substantially parallel to one another as well as to the roller bearings 174. A pair of coils 136 are mounted to opposite sides of the bottom surface of first stage 120 as shown in FIG. 2. The coils 136 may be bolted, screwed, or otherwise fixed to the stage 120. The coils are positioned so as to fit within the fixed portions without touching the fixed portions, as shown in FIG. 6 and described above with regard to the linear motors for the second support stage. The fixed portions 132 are mounted at a height with respect to the first support 120, that prevents the coils 136 from bottoming out on the U-shape surface within the respective fixed portions 132 when the first stage 120 is supported by the roller bearings 174 and bearing races 172.

Referring to FIG. 3, the bearing race 172 shown on the left side of the FIG., as well as the bearing race 172 located directly behind that bearing in the FIG. (not shown) are fixedly mounted to the bottom of support stage 120. The fixed bearing races 172 on the left side of FIG. 3 are aligned parallel to the roller bearings 174 which they will fit and roll over, and parallel to the coil 136. The bearing race 172 on the right side of FIG. 3, as well as the bearing race 172 located directly behind that bearing in the FIG. (not shown) are flexibly mounted to the first support via flexure mountings 176 (FIG. 2).

Figure 10:
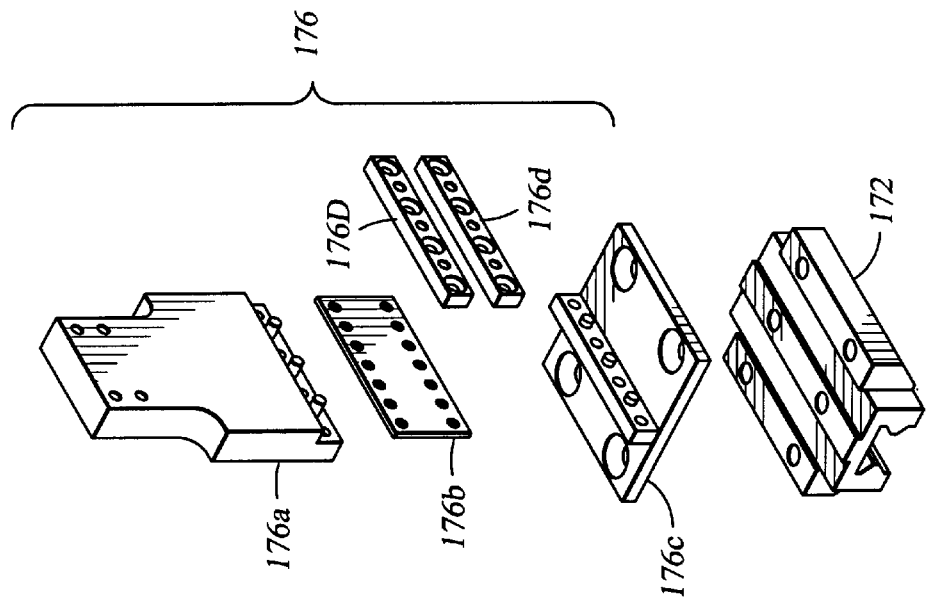
FIG. 10 is an exploded view of a flexure mount according to the present invention.

As shown in an exploded view in FIG. 10, each flexure mounting 176 includes a rigid base plate 176a that is fixed to the support structure (first or second support structure). A thin metal flexure (flexible plate) 176b is interconnected between base plate 176a and mounting plate 176c by brackets 176d and bolts, screws or other equivalent connectors (not shown). The bearing race is mounted to mounting plate 176c using similar connectors. With this type of mounting, the bearing race is free to flex and twist within a limited range made possible by the flexibility of flexible plate 176b, and in the example described is capable of a limited amount of twisting and flexing relative to the support 120 and the opposite bearing/race arrangement (left side of FIG. 3). This flexibility allows the first support to smoothly move along the support pathways defined by the parallel bearing and race arrangements, even when a slight deviation from a parallel positioning occurs, either through temperature variations, design tolerances, slight misalignment of the bearings from perfect parallel positioning, etc. Similarly, one set of bearing races is provided with this flexibility on the second support stage to provide the same benefits.

Support stages 120 and 170 are preferably formed of Aluminum or other light weight metal in an effort to keep the inertial mass to be moved to a minimum The first stage 120 is provided with reinforcing beams 122 of aluminum to help maintain planarity of the support surface while supporting the load of the substrate carrier and associated components described below.

As indicated previously and shown in FIG. 3, the substrate carrier 102 is supported by the X-Z stage 120. The substrate carrier 102 is mounted to a column 220 which is supported for vertical movement (i.e., movement in the "Z direction" as shown in FIG. 3). The upper end of the column 220 is mounted to a driver 240 which is adapted to provide a driving force in the Z-direction. Preferably, the drive 240 is a voice coil motor, but other equivalent, drivers could be substituted. In general, the travel distance in the Z-direction is not required to be very large, as the driver is used mainly to preset a vertical position of the substrate carrier 102 against the polishing surface, with a desired amount of force. A position sensor 250, preferably an encoder or linearly variable differential transformer (LVDT) is provided to sense the vertical positioning of extendible portion of the voice coil motor 240 and consequently the substrate carrier 102.

The immovable part of the driver 240 and the position sensor 250 are supported by the first support 120 through support arms 252 which interconnect the driver 240 housing with support ring 254. Support ring 254 is mounted to first support 120 by bolts, screws or other equivalent connectors. Support ring 254 and support arms 252 are preferably made of aluminum or other lightweight, structurally rigid metal. Although three support arms 252 are shown supporting the driver 240 in FIG. 3, the invention is not limited to this number as two, four or more support arms could be employed. However, three is a preferable number considering the rigidity it provides with a minimum of weight. The support ring 254 is provided with a number of supporting columns 256 and a number of cutout areas 258 in the interests of weight reduction.

The weight of the substrate carrier 102 and column 220, as well as the moveable portion of the driver 240 are born by an arrangement of adjustable air cylinders 260 mounted on opposite sides of the column 220. As shown in FIG. 1, the lower ends of cylinders 260 are bolted or otherwise connected to the first support 120. The extendible shaft 261 of each cylinder 260 is mounted, preferably by a ball and socket or equivalent joint 266, to a horizontal support arm 262. Horizontal support arms 262 are threaded or otherwise affixed into column 220.

Air input lines 268 are provided on each of the air cylinders 260 so that the internal pressure of the cylinders 260 may be controlled to control the amount of extension or height of the extendible shafts 261. Thus, air cylinders can be manually or automatically (e.g., by microprocessor) controlled to adjust a homing position or "setpoint" of the vertical height of the substrate carrier.

Figure 9:
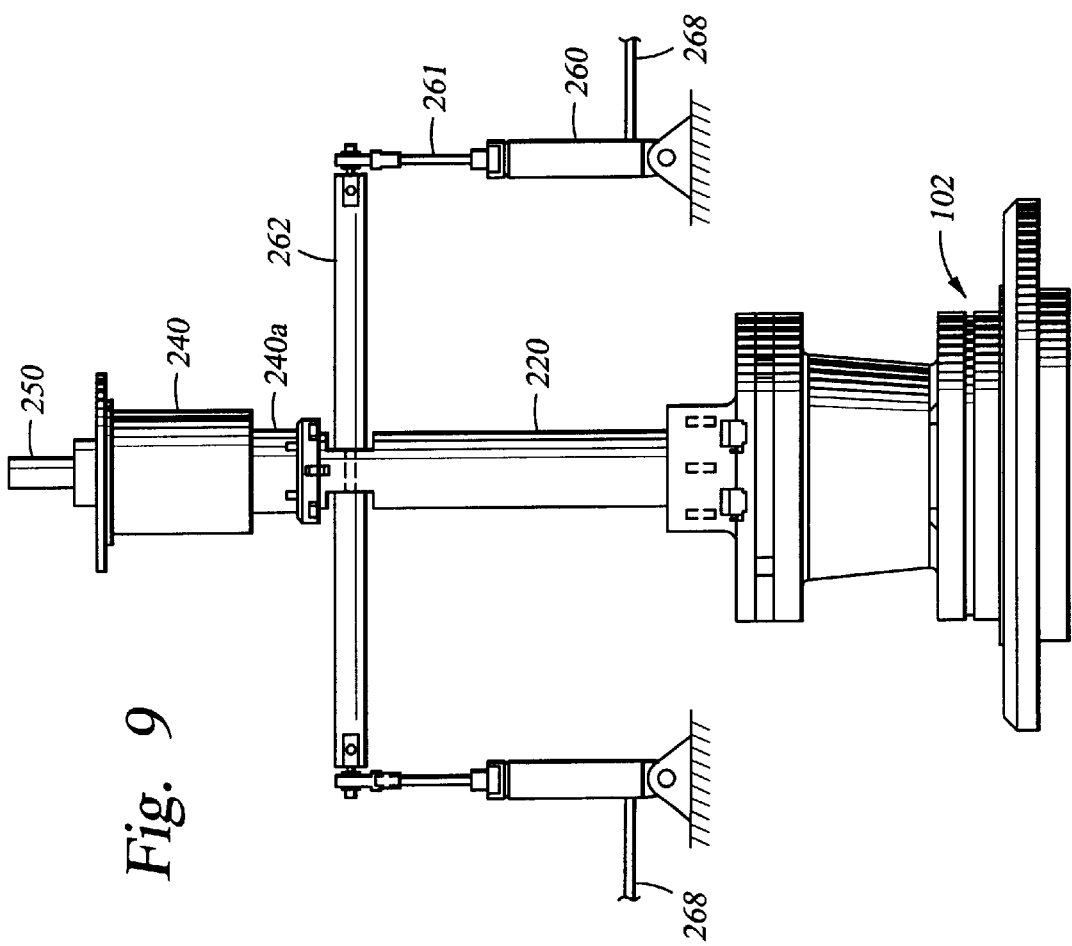
FIG. 9 is a view of the column which connects the Z-drive with the carrier, and the support system therefor.

FIG. 9 is an isolated view of the substrate carrier 102, column 220, driver 240, position sensor 250 and the supporting structure for supporting the weight of the substrate carrier, column and moving portion of the driver for transfer to the first supporting stage 120. The air cylinders 260 are schematically shown as being mounted to a support surface which signifies support stage 120. As can be seen more clearly in FIG. 9, the column 220 extends from driver 240 all the way to the connection with substrate carrier 102 and thus supports the load of the substrate carrier 102 and vertically moves with the substrate carrier 102.

Accordingly, a starting or setpoint position may be established by de-energizing the driver 240 so that its movable portion 240a may be freely adjusted by external forces. Next, the air pressure within air cylinders 260 is adjusted to raise or lower the horizontal support bars 262 as desired to establish the starting height of substrate carrier 102. Once the setpoint is established, only a small force need be generated by the driver 240 to incrementally adjust the vertical position of the substrate carrier, since the resistance of the air cylinders is roughly equilibrated with the mass that they are supporting. The result is that the carrier 102 and associated linkage appear to "float" on the air cylinder support and are easily moved by the driver 240.

Although only two air cylinders 260 are shown in the figures herein, it is noted that a pair of cylinders may be mounted at each end of the supporting arms, depending upon the weight of the components that need to be supported and the performance specifications of the air cylinders. It is even contemplated that three or some other number of cylinders might be provided at each end of the support arms and that the invention should not be limited to the number of air cylinders shown in the figures. The preferred air cylinders are Airpel Anti-Stiction Air Cylinder by Airpot Corporation of Norwalk, Conn.

In order to prevent movements of the column 220 in directions other than the Z direction, the column 220 is mounted to the support ring with a pair of spiral flexures 280. One spiral flexure 280 is mounted at a height that is approximately equal to the top height of the support ring 254 and the other is mounted at about the same height as the bottom of the support ring 254, as shown in FIG. 1. FIG. 4 shows a spiral flexure 280 in better detail. The spiral flexure is formed of metal, preferably a sheet of spring steel or other thin sheet of relatively rigid metal. Boundary portions 282 and 284 are provided along the inner and outer circumferences of the spiral flexure 280 to improve failure resistance at the points of connection. Mounting holes 286 are used to mount the spiral flexure 280 to the column 220 using bolts or other equivalent connectors, while the mounting holes 288 are provided for connecting the spiral flexure 280 to the support ring 254 in like manner.

Spiral slots 290 begin near the border of the boundary portion 284 and spiral radially inwardly to end near the border of the boundary portion 282. The slots 290 are preferably radiused at each end 292 to prevent stress concentration. The spiral slots allow deformation of the boundary portion 282 with respect to the boundary portion 284 in directions perpendicular to the plane of the spiral flexure 280, but substantially prevent any radial movement of the boundary portion 282 with regard to the boundary portion 284. When assembled, the spiral flexures 280 effectively restrict movements of the column 220, moveable portion of the driver 240a and substrate carrier 102 to the Z direction shown in FIG. 3.

After establishing the setpoint or starting position of the substrate carrier 102, the driver 240 is actuated to apply the substrate carrier 102 against the polishing surface or to a desired position either above or below the setpoint. Upon achieving the desired position, it is then desirable to maintain that position, at least during polishing. Because the driver 240 is designed to be lightweight and is not designed to withstand the forces that might be transferred to it during polishing, a mechanical arrangement is provided to maintain the desired positioning that is initially set by the driver 240. Preferably, a clamping flexure 300 is provided to fix the vertical position of the column 220 with respect to the first support stage 120.

The clamping flexure is supported by and mounted to the support columns of the support ring 254 along the mounting portion 302. A biasing portion 306 of the clamping flexure prebiases the clamping portion 304 to a clamped position around the column 220. Bellville washers or other biasing members are provided around a bolt 310 to maintain a biasing pressure which effectively tends to squeeze arms 306a,306a toward one another so as to apply the clamping force. When it is desired to move the vertical position of the substrate carrier, to set the setpoint, remove a substrate, or for whatever purpose, the clamping flexure must be released from the clamping position to allow the free vertical movement of the column 220.

To release the clamping force, an air cylinder 312 (or other actuator, e.g., a solenoid, hydraulic piston, etc.) is provided. Upon increasing the air pressure within air cylinder 312, piston 314 is biased to compress or press together the Bellville washers 308 thereby releasing the biasing pressure upon arms 306a,306a and freeing the column 220 for vertical movement. When a desired vertical position of the substrate carrier has been reached, the air pressure is released from or reduced within the air cylinder 312, allowing the Bellville washers to drive the piston 314 away and to reapply a clamping force through the arms 306a,306a.

Figure 11:
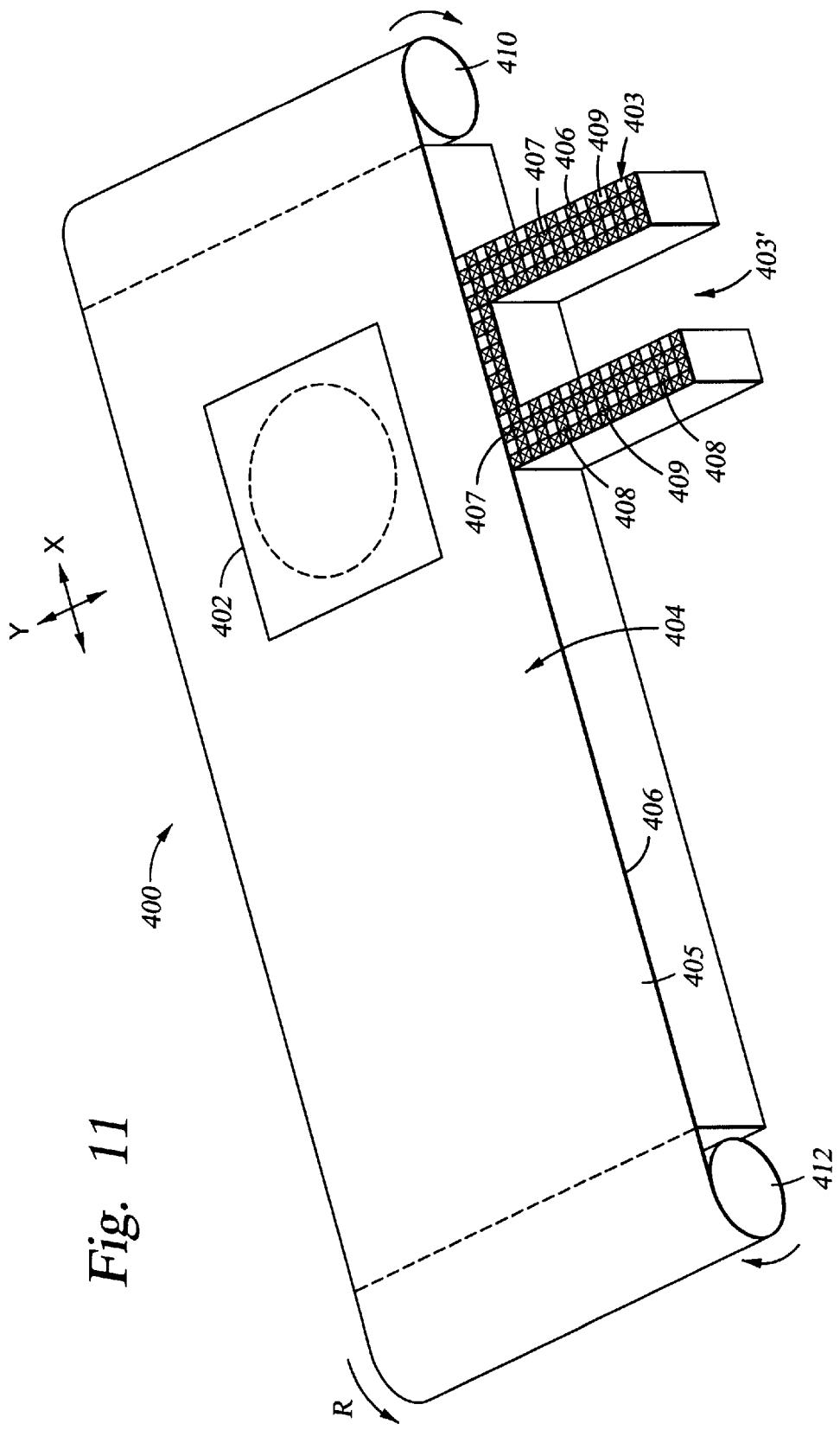
FIG. 11 is a perspective view of another embodiment of a linear drive mechanism according to the present invention.
Figure 12:
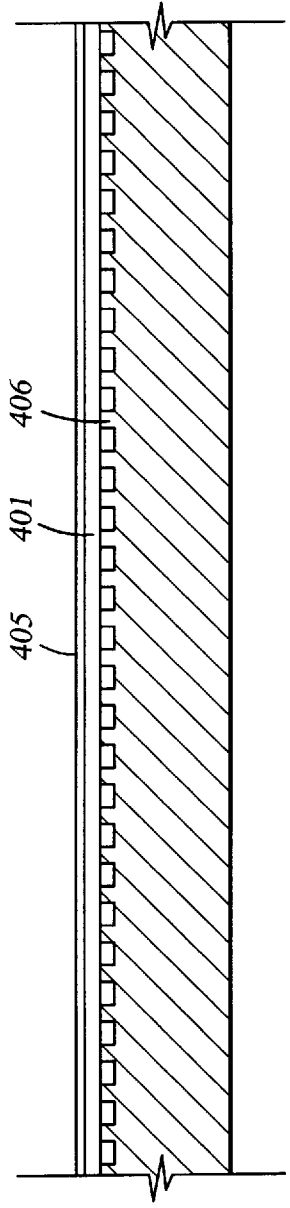
FIG. 12 is a sectional view of an alternate arrangement of the polishing surface shown in FIG. 11.

FIG. 11 shows another embodiment of a linear drive mechanism 400 for chemical mechanical polishing according to the present invention. A substrate carrier 402 is provided to hold a substrate (not shown) against a polishing surface 404, and to move the substrate in an X-Y plane according to predetermined polishing pattern to accomplish polishing of the substrate. A support structure upon which the carrier 402 is mounted includes a polishing plate 406 which, together with the polishing pad 405 form the polishing surface 404. Additionally, an elastic, flexible pad 401 may be positioned between polishing plate 406 and polishing pad 405, as shown in FIG. 12. Preferably, the flexible pad comprises a polycarbonate layer on top of a polyurethane layer, although other equivalent compositions may be used for the flexible pad. The flexible pad 405 is mounted to the polishing plate 406, to help maintain uniformity of the polishing surface during polishing.

The polishing plate 406 is preferably a plate of ferromagnetic material such as iron or steel having a plurality of substantially equally spaced parallel grooves 407 cut into the surface thereof along one axial direction of the plate (the "Y" direction shown in FIG. 11), and a plurality of grooves 408 cut into the surface of the plate 406 perpendicular to grooves 407. The spacing between grooves 408 is preferably substantially equal to the spacing between grooves 407. Between the grooves 407 and 408 are formed projections or spikes 409, which are formed of the ferromagnetic material and project to the surface of the polishing plate 406. The grooves 407 and 408 are preferably filled with a non-magnetic material such as a plastic, resin or equivalent to form a smooth an planar surface with the projections 409 while maintaining a magnetic separation between the projections 409. Alternatively, the grooves may be left open with air separating the magnetic projections 409 although this arrangement is not as preferable.

The entire polishing plate 406 is grooved as described above, although only a portion of the grooving can be seen in FIG. 11 since the polishing pad 405 (and optionally, elastic, flexible pad 401) covers the majority of the polishing plate 406. The polishing pad 405 preferably comprises a thin film having an abrasive thereon. The thin film is contained in a magazine which includes a take up roller 410 and delivery roller 412 on opposite ends of the polishing plate 406. The take up roller is preferably motor driven to advance the polishing pad 405 and the delivery roller 412 is preferably provided with a motor, brake or other means of providing a resistive force R in the direction opposite the direction of advancement so as to be able to control an amount of tension that is applied to the polishing pad 405 between the rollers 410,412. The preferred magazine and film are disclosed in copending application Ser. No. 08/833, 278, entitled "Polishing Media Magazine for Improved Polishing", the entirety of which is hereby expressly incorporated by reference herein. Alternatively, the polishing pad may be a fixed abrasive containing layer mounted on the polishing plate 406, with or without a flexible pad 401 mounted therebetween, or other equivalent. The flexible pad 401 is preferably an elastic, flexible pad comprising a polycarbonate layer on top of a polyurethane layer, although other equivalent compositions may be used.

Figure 14:
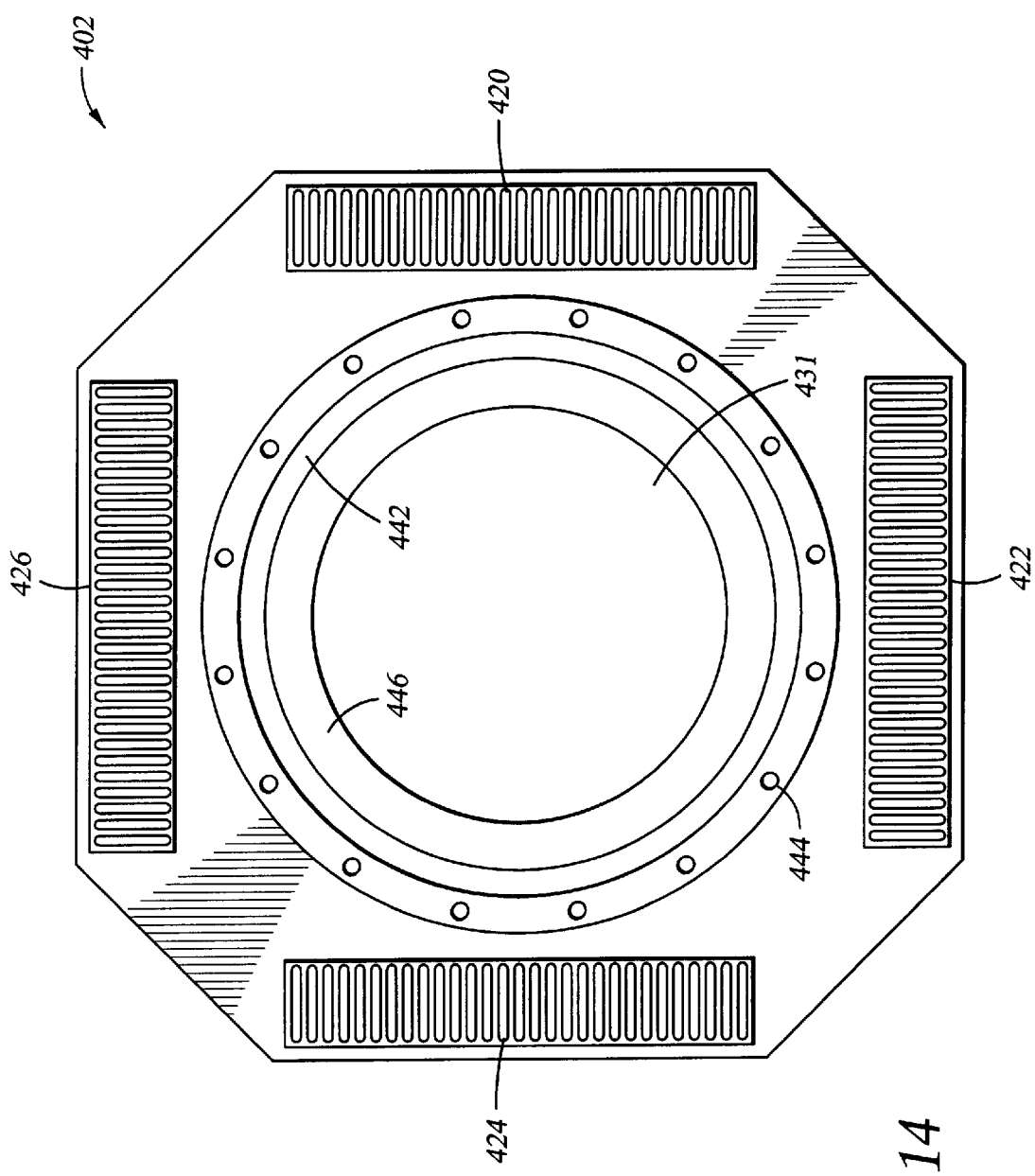
FIG. 14 is a bottom view of the carrier shown in FIG. 13.

The carrier 402 preferably includes four sets of magnets 420,422,424 and 426 mounted therein (see FIG. 14) with the pole faces of the magnets being approximately flush with the platen 431 of the carrier, so that they can be positioned closely adjacent the polishing surface 404. Each pole face has one or more ridges of magnetic material and preferably is provided with a plurality of ridges of the same width and spacing as the projections 409 of the magnetic material in the polishing plate 406. A detailed description of the operation and functioning of the magnets 420,422,424 and 426 with respect to the projections 409 can be had by referring to U.S. Pat. No. 3,376,578, the entirety of which is hereby incorporated by reference herein.

Referring back to FIG. 11, the functioning and movement of the carrier 402 with regard to the polishing surface is the same in the X direction as it is in the Y direction, and both directions may be simultaneously controlled so as to produce any desired polishing pattern of the carrier 402 along the polishing surface 406. Regardless of the polishing pattern, however, the magnets 420,424, and 422,426, remain parallel with the grooves 407 and 408, respectively. Thus, the carrier 402 maintains uniform average velocity between all points on the polishing surface of the substrate and the polishing surface 404 at all times along any selected polishing pattern.

Magnetic coupling is utilized between the magnets 420, 422,424 ad 426 and the polishing plate 406 for moving and positioning the carrier 402 along the polishing surface. Additionally, the attractive force between magnets 420,422, 424 and 426 and the polishing plate 406 provides a force F in the Z direction (see FIG. 13) which is required to effectively polish the surface of the substrate. The force F can be varied and controlled by controlling the distance between the magnets (420,422, 424 and 426) and the polishing plate 406. Preferably, the distance between the magnets and polishing plate is controlled by varying the vertical position of a ring assembly described hereafter.

Figure 13:
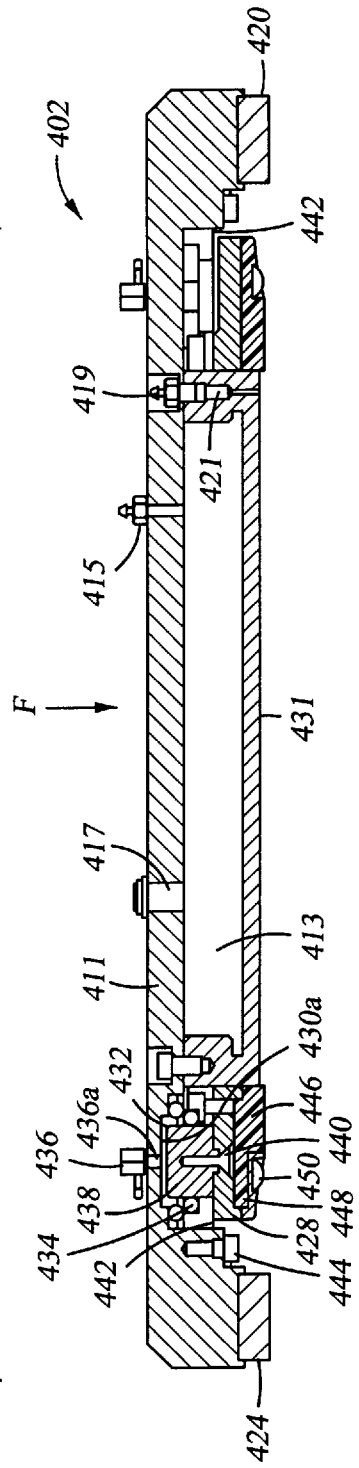
FIG. 13 is a sectional view of a carrier for use with the linear drive mechanism of FIG. 11.

As shown in FIG. 13, the carrier 402 is further provided with a ring assembly which functions to retain the substrate in juxtaposition with the platen 431 surface during polishing. The ring assembly includes rings 428, 446 and 448. The vertical position of the ring assembly with respect to the platen 431 surface can be accurately controlled and varied as the need arises. In addition to controlling the amount of down force F (i.e., force in the Z direction), applied to the substrate during polishing, the pressure applied by ring 446 against the abrasive surface during polishing may be accurately controlled, and acts to minimize any standing waves of chemical slurry (or of the abrasive pad) that tend to be generated by the motion of the carrier during polishing.

The vertical position of the ring assembly 428,446,448 is preferably controlled by the positioning of air cylinders circumferentially around the carrier between ring 428 and the top plate 411 of the carrier. Cavities 430a are formed in a channel 430 circumferentially about top plate 411 and are preferably equidistantly circumferentially placed. In a preferred embodiment, six cavities 430a are formed in the channel 430, but more or fewer cavities may be used. Equidistant circumferential placement of the cavities is preferred, since the cavities define the locations from which pressure is exerted against ring 428, and it is desirable to have the ability to apply a substantially constant force around the circumference of the ring 428.

A diaphragm 432 is mounted in each of cavities 430a, and a cylinder ring 434 is fixed to the bottom side of the top plate 411 (preferably by screws or bolts or other equivalent fixation elements) to seal each diaphragm 432 in an airtight manner between each respective cylinder ring 434 and the top plate 411. Thus, a sealed cavity is formed between each diaphragm 432 and cavity 430a. On the top side of top plate 411, opposite each cavity 430a location, a port 436a is formed. A pressure fitting 436 is fixed within each port 436a, preferably by mating threads. However, other equivalent methods of fixation may be employed. Also, various known types of thread sealant may be applied between the mating threads of the pressure fitting 436 and port 436a to improve the seal therebetween.

Pressure fittings 436 are connectable to tubing (not shown) for application of pressure/vacuum to control the pressure within the cavities 430a. Increase of pressure within cavities 430a causes a distention of diaphragms 432. Pistons 438 are abutted against diaphragms 432 in cavities 430a. Ring 428 is mounted to pistons 438, preferably by screws 440 although alternative, equivalent fixation elements may be employed. Screws 440 are countersunk with respect to the surface of ring 428 so as not to protrude beyond the under surface of ring 428.

Flexure ring 442 is mounted to the top plate 411 via screws 444 or other equivalent fixation elements, and is also mounted between ring 428 and pistons 438 via screws 440. Flexure ring 442 is preferably made of a nonmagnetic metal or composite having stiff yet resilient properties. Flexure ring 442 functions to connect ring 428 to the top plate 411, while allowing some vertical movement of ring 428 with respect to the top plate 411. Thus, when pressure is applied to cavities 430a, diaphragms 432 distend to move pistons 438, and hence, ring 428, in a vertical direction away from the top plate 110. Assuming the ring 146 is abutted against the polishing surface 404 at the time of pressurizing the cavities 430a, this effectively moves the magnets 420,422, 424,426 away from the polishing plate 406 each by an equal distance, effectively reducing the attractive force between the magnets and the polishing plate and ultimately reducing the force F of the carrier against the wafer and polishing surface.

Upon release of the pressure within cavities 430a, potential energy stored in the flexure element is converted to kinetic energy and, aided by the attractive forces between the magnets and the polishing plate, acts to retract ring 428 and pistons 438 in a vertical direction toward the top plate 411, thereby reducing the distance between the magnets and the polishing plate and increasing the force F.

Retainer 446 is preferably made of a polyacetyl copolymer such as DELRIN (or other substantially equivalent linear acetal resin, or polyphenko ertalyte). A clamp ring 448 and screws or other equivalent attachment devices 450 are preferably made of aluminum or other nonmagnetic metal or composite suitable for use in the production of the substrate carrier according to the present invention as described above. Clamp ring 448 is sufficiently rigid to ensure an immovable fixation of the retainer 446 with ring 428.

Retainer 446 is designed to be durable and tough, but is expected to wear during operation. Retainer 446 is substantially electrically nonconductive to avoid any potential interference with the semiconductive properties of the wafer (e.g., wear of a metal retainer could introduce metal particles into the wafer), and nonmagnetic so as not to interfere with the operation of the magnets 420,422,424,426 with the polishing plate 406. Retainer 446 may be readily replaced after sufficient wear has occurred.

Although the control of the vertical position of the ring assembly has been specifically described with regard to the diaphragm/piston assembly set forth above, it is to be noted that other pneumatic, hydraulic or motor driven arrangements could be substituted to effectively control the vertical position of the ring assembly with respect to the substrate carrier, so as to control the downward force F of the platen 431 upon the substrate.

Figure 17:
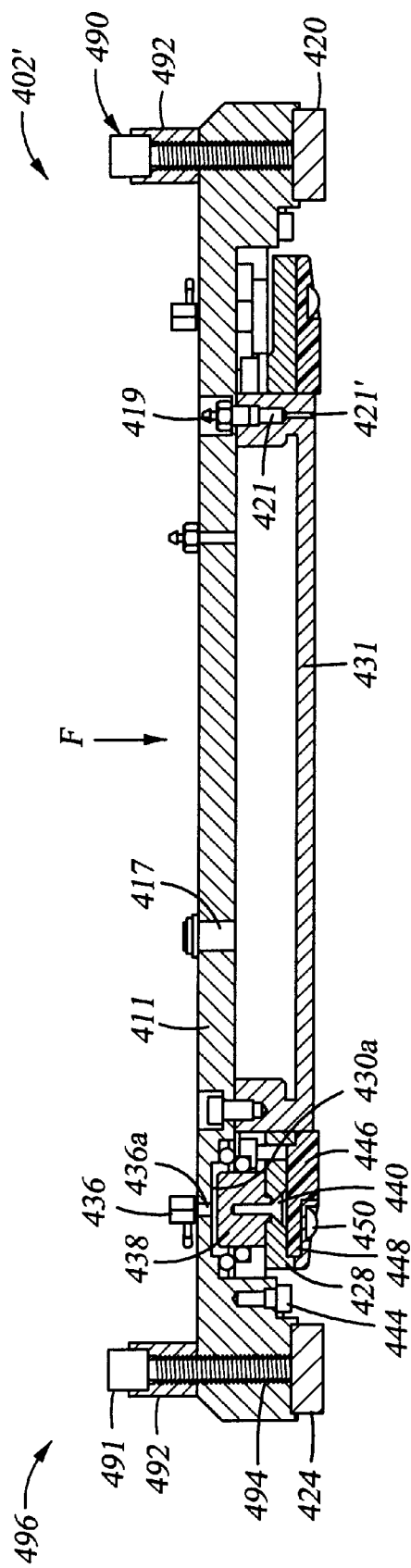
FIG. 17 is a sectional view of a variant of the carrier shown in FIG. 13.

Still further, additional and independent magnet drivers 490 may be provided to adjust the vertical position of magnets 420,422,424,and 426 with respect to the carrier 402' as well as the ring assembly, as shown in the variant of FIG. 17. In this arrangement, a step motor 491 or other controllable electrical motor is mounted to the top of the carrier 402' via mount 492 adjacent each end of each magnet 420,422,424 and 426. Thus, a pair of magnet drivers 490 are preferably provided for each of magnets 420,422,424 and 426. Each motor 491 is connected to an end of one of the magnets via a screw drive 494. Accordingly, the motors can be controlled for synchronous movement to maintain the magnets parallel to each other and to the polishing surface 406. Thus, the downward "Z force" can be controlled independently of the vertical positioning of the ring assembly with respect to the carrier 402'.

The carrier is further preferably provided with a chamber 413 which may be pressurized/evacuated to alter the shape of the platen 431. a pressure fitting 415 is provided for accessing the chamber 413 to supply pressurized air or other gas or fluid to vary the surface conformation of the platen 431, and ultimately vary the pressures applied to different portions of the surface of the substrate to be polished, as needed. For example, the pressure in chamber 413 can be increased to cause platen 413 to bow outwardly so as to apply additional pressure to the central portion of a substrate, thereby increasing the rate of polishing in the central portion. A pressure gauge 417 is preferably provided to interface with the chamber 413 so as to provide feedback for controlling the internal pressure of the chamber, either manually or automatically.

Optionally, a second chamber 421 or port may be provided for applying air pressure or vacuum directly to the substrate through the platen, as shown at port 421. One or more pressure fittings 419 are provided for separate control of the port 421, to either hold the substrate against the platen 431 using a vacuum or to disengage the substrate from the platen 431 with air pressure.

Figure 15:
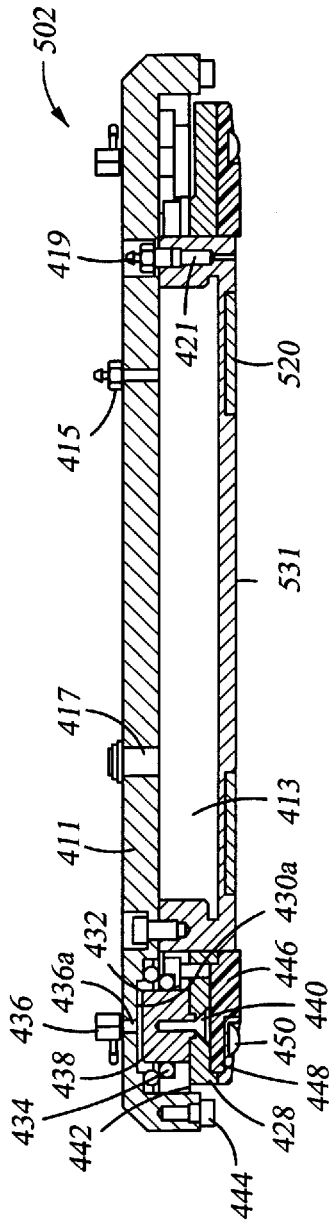
FIG. 15 is a sectional view of another carrier for use with the linear drive mechanism of FIG. 11.
Figure 16:
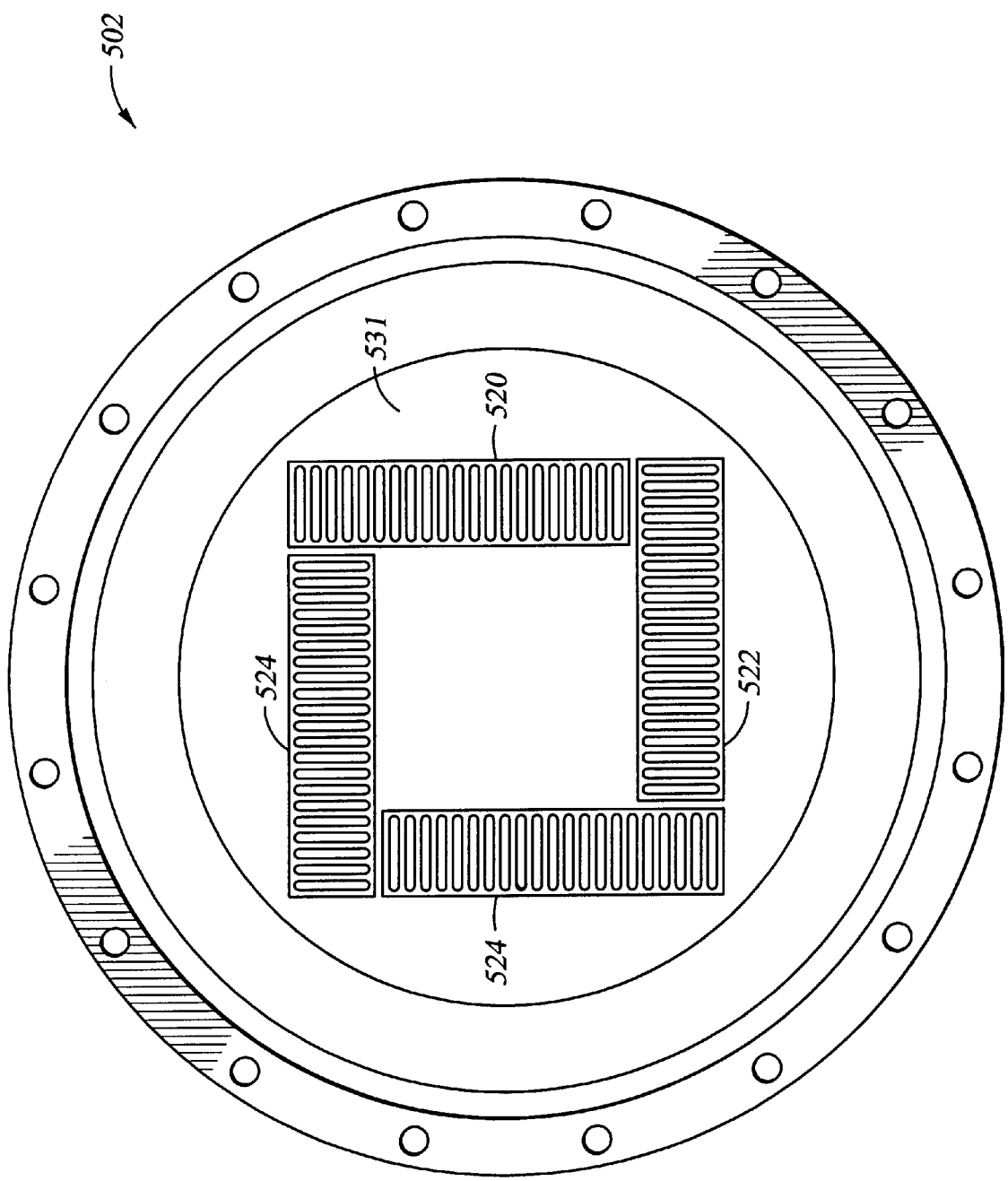
FIG. 16 is a bottom view of the carrier shown in FIG. 14.

FIG. 15 shows an alternative embodiment of a carrier 502 for use with the apparatus shown in FIG. 11, whereby the carrier 502 would be substituted for the carrier 402 shown in FIG. 11. The carrier 502 preferably includes four sets of magnets 520,522,524 and 526 (see FIG. 16) which are analogous to the magnets 420,422,424 and 426 in the embodiment shown in FIG. 13. However, unlike the embodiment shown in FIG. 13, the magnets 520,522,524 and 526 are mounted in the platen 531 with the pole faces of the magnets being approximately flush with the platen 531 of the carrier 502, so that they form a planar surface with the surface of the platen 531 as shown in FIG. 15. The magnets may be mounted in the platen 531 by bolting, screwing, epoxy, or other equivalent fixation means which will securely hold the magnets flush with the platen even during slight flexing of the platen. Each pole face has one or more ridges of magnetic material and preferably is provided with a plurality of ridges of the same width and spacing as the projections 409 of the magnetic material in the polishing plate 406.

Thus, in this embodiment, the magnets 520,522,524 and 526 actually contact the back side of the substrate during polishing. Nevertheless, a downward or "Z" direction force is still provided by the attractive forces between the magnets 520,522,524 and 526 with the polishing plate 406, as the magnetic fields pass through the substrate.

The carrier 502 is further provided with a ring assembly which functions to retain the substrate in juxtaposition with the platen 531 surface during polishing, just as described with the embodiment of FIG. 13. Likewise, the vertical position of the ring assembly with respect to the platen 531 surface can be accurately controlled and varied as the need arises. In addition to controlling the amount of down force F (i.e., force in the Z direction), applied to the substrate during polishing, the pressure applied by ring 446 against the abrasive surface during polishing may be accurately controlled, and acts to minimize any standing waves of chemical slurry (or of the abrasive pad) that tend to be generated by the motion of the carrier during polishing.

In order to provide for more efficient interchange of substrates to be polished, the polishing plate 406 is preferably provided with an interchange section 403 which extends beyond the boundaries of the polishing pad 405. Although the interchange section is shown as extending from the side of the polishing pad 405, the placement of the same is not to be so limited as the interchange section 403 may be place anywhere along the boundary of the polishing pad. The interchange section 403 is shown in FIG. 11 to be formed substantially in a "U" shape which has been found to be the most efficient arrangement for its function. However, the section 403 may be formed in other configurations, so long as an opening 403' is provided which is dimensioned to allow a substrate to pass therethrough while at the same time supporting at least a pair of outer edges of the carrier.

In practice, after completion of polishing of the substrate with the apparatus shown in FIG. 11, or at any time when the operator desires to visually inspect the polished surface of the substrate, the carrier 402 can be controlled to move off the polishing pad and onto the interchange section where the Y-direction (in this example) magnets would still function to move the carrier 402. Upon fully positioning the carrier 402 on the interchange section 403, the substrate would then be free to drop though the opening 403' for receipt and inspection by the operator.

Additionally or alternatively, the magnet drivers 490 may be designed to position the magnets low enough, with respect to the platen, to allow the operator to freely slide the substrate out from beneath the platen and ring assembly and to slide another substrate into position to be polished.

Although there have been described above specific arrangements of linear drive devices for polishing, with a limited selected number of alternative embodiments in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as set forth in the claims which follow.

What is claimed is:

1. A drive mechanism for chemical mechanical polishing, comprising:

a substrate carrier adapted to hold a substrate against a polishing surface for polishing the substrate, said substrate carrier including a face adapted to contact the substrate;

said substrate carrier being mounted to a support structure;

said support structure being adapted to guide linear movements of said substrate carrier along two substantially perpendicular directions;

at least one linear motor associated with said support structure; and a driver associated with said substrate carrier, said driver supported by said support structure, said driver adapted to provide a force to at least a portion of said face along a third direction substantially perpendicular to said two substantially perpendicular directions.

2. The drive mechanism of claim 1, further comprising:
a base upon which said support structure is movably mounted;
wherein said support structure comprises a first support stage moveable, with respect to said base, in one of said two substantially perpendicular directions; and
a second support stage mounted on said first support stage and moveable, with respect to said first support stage, in the other of said two substantially perpendicular directions.

3. The drive mechanism of claim 2, wherein said at least one linear motor comprises:
a first linear motor mounted between said base and said first support stage; and
a second linear motor mounted between said first support stage and said second support stage.

4. The drive mechanism of claim 3, said first support stage having a pair of sides aligned substantially parallel with said one of said two substantially perpendicular directions, and said second support stage having a pair of sides aligned substantially parallel with said other of said two substantially perpendicular directions;
wherein said first linear motor is mounted between said base and one of said pair of sides of said first support stage, and said second linear motor is mounted between said first support stage and one of said pair of sides of said second support stage;
said at least one linear motor further comprising a third linear motor mounted between said base and the other of said pair of sides of said first support stage, and a fourth linear motor mounted between said first support stage and the other of said pair of sides of said second support stage.

5. The drive mechanism of claim 4, further comprising:
at least one flex mount mounting one of said first and third linear motors to said first support stage; and
at least one flex mount mounting one of said second and fourth linear motors to said second support stage.

6. The drive mechanism of claim 1, further comprising a column interconnecting said substrate carrier and said driver;
wherein said column transfers a driving force from said driver to said substrate carrier, while restraining said substrate carrier from movements perpendicular to a direction of said driving force.

7. The drive mechanism of claim 1, further comprising a position sensor connected to said driver to sense a position of said substrate carrier along a direction of a driving force produced by said driver.

8. The drive mechanism of claim 7, wherein said position sensor comprises an encoder.

9. The drive mechanism of claim 7, wherein said position sensor comprises a linearly variable differential transformer.

10. The drive mechanism of claim 1, wherein said driver comprises a voice coil motor.

11. The drive mechanism of claim 1, further comprising support arms mounted to an exterior of said driver and supported by said support structure.

12. The drive mechanism of claim 11, further comprising:
a support ring mounted to said support structure and connected to said support arms.

13. The drive mechanism of claim 1, further comprising:
a support apparatus interconnecting said substrate carrier with said support structure.

14. The drive mechanism of claim 13, wherein said support apparatus comprises:
displaceable support members connecting said substrate carrier with said support structure, wherein a position of said substrate carrier along said third direction is adjustable by controlling a displacement of said displaceable support members, and wherein said displaceable support members support a mass of said substrate carrier.

15. The drive mechanism of claim 14, wherein said displaceable support members support at least a portion of a mass of said driver.

16. The drive mechanism of claim 14, further comprising:
a column interconnecting said substrate carrier and said driver;
wherein said support apparatus further comprises at least one linking member linking said displaceable support members to said column.

17. The drive mechanism of claim 12, further comprising a column interconnecting said substrate carrier and said driver; said column located substantially centrally of said support ring.

18. The drive mechanism of claim 17, further comprising at least one stabilizer connecting said column with said support ring, said at least one stabilizer allowing vertical movements of said column with respect to said support ring and substantially preventing movements of said column in directions perpendicular to vertical with respect to said support ring.

19. The drive mechanism of claim 18, wherein said at least one stabilizer comprises at least one spiral flexure.

20. The drive mechanism of claim 17, further comprising a clamping flexure mounted to said support ring and releasably clamping said column, wherein said column is substantially immovable in said third direction when clamped, but is movable by said driver when unclamped.

21. The motor mechanism of claim 1, wherein said at least one linear drive associated with said support structure comprises a plate member and a plurality of magnets separate from said plate member and mounted to said substrate carrier.

22. The drive mechanism of claim 21, wherein said driver comprises said plurality of magnets which provide the force along said third direction by an attractive force generated between said plurality of magnets and said plate member.

23. The drive mechanism of claim 21, wherein said plate member comprises a plurality of projections extending in rows along two substantially perpendicular directions, said projections being selectively energizeable to produce forces between said projections which are energized and magnets, selected from said plurality of magnets, which are aligned with said energized projections.

24. A linear drive mechanism for polishing, comprising:
a substrate carrier having a surface adapted to hold a substrate against a polishing surface for polishing the substrate;
a first support stage moveable in one of two substantially perpendicular directions;
a second support stage mounted on said first support stage, supporting said substrate carrier, and moveable, with respect to said first support stage, in the other of said two substantially perpendicular directions;
a base upon which said first support stage is movably mounted;

at least one first motor mounted between said base and said first support stage for driving said first support stage in said one of two substantially perpendicular directions;

at least one second motor mounted between said first and second support stages for driving said second stage with respect to said first stage; and a driver engaging said substrate carrier and supported by said support structure, said driver being oriented to provide a driving force to said substrate carrier along a third direction substantially perpendicular to said two substantially perpendicular directions.

25. The linear drive mechanism of claim 24, further comprising a column interconnecting said substrate carrier and said driver, and movably supported by said second support stage.

26. The linear drive mechanism of claim 24, wherein said at least one second motor comprises a pair of linear motors.

27. The drive mechanism of claim 24, further comprising a clamping flexure mounted to said second support stage and releasably fixing said substrate carrier in a position along said third direction, wherein said substrate carrier is substantially immovable in said third direction when fixed by said clamping flexure, but is movable by said driver when released by said clamping flexure.

28. The linear drive mechanism of claim 24, wherein said at least one first motor comprises a pair of linear motors.

29. A drive mechanism for chemical mechanical polishing, comprising:

a substrate carrier adapted to hold a substrate against a polishing surface for polishing the substrate, said substrate carrier including a face adapted to contact the substrate;

a first support stage moveably mounted to a base, said first support stage being substantially linearly movable in a first direction with respect to said base;

a second support stage mounted on said first support stage and substantially linearly moveable, with respect to said first support stage, in a second direction substantially perpendicular to said first direction;

a first linear motor mounted between said base and said first support stage; and a second linear motor mounted between said first support stage and said second support stage; and a driver associated with said substrate carrier, said driver adapted to provide a force to at least a portion of said face along a third direction substantially perpendicular to said first and second directions.

30. The drive mechanism of claim 29, wherein a pair of said first linear motors are mounted between said base and said first support stage, and a pair of said second linear motors are mounted between said first and second support stages.

31. A drive mechanism for chemical mechanical polishing, comprising:

a substrate carrier adapted to hold a substrate against a polishing surface for polishing the substrate, said substrate carrier including a face adapted to contact the substrate;

said substrate carrier being mounted to a support structure; said support structure being adapted to guide linear movements of said substrate carrier along two substantially perpendicular directions;

at least one linear driver associated with said support structure;

a driver associated with said substrate carrier, said driver adapted to provide a force to at least a portion of said face along a third direction substantially perpendicular to said two substantially perpendicular directions; and an encoder connected to said driver to sense a position of said substrate carrier along a direction of a driving force produced by said driver.

32. A drive mechanism for chemical mechanical polishing, comprising:

a substrate carrier adapted to hold a substrate against a polishing surface for polishing the substrate, said substrate carrier including a face adapted to contact the substrate;

said substrate carrier being mounted to a support structure; said support structure being adapted to guide linear movements of said substrate carrier along two substantially perpendicular directions;

at least one linear driver associated with said support structure;

a driver associated with said substrate carrier, said driver adapted to provide a force to at least a portion of said face along a third direction substantially perpendicular to said two substantially perpendicular directions; and a linearly variable differential transformer connected to said driver to sense a position of said substrate carrier along a direction of a driving force produced by said driver.

33. A drive mechanism for chemical mechanical polishing, comprising:

a substrate carrier adapted to hold a substrate against a polishing surface for polishing the substrate, said substrate carrier including a face adapted to contact the substrate;

said substrate carrier being mounted to a support structure; said support structure being adapted to guide linear movements of said substrate carrier along two substantially perpendicular directions;

at least one linear driver associated with said support structure; and a voice coil motor associated with said substrate carrier, said voice coil motor adapted to provide a force to at least a portion of said face along a third direction substantially perpendicular to said two substantially perpendicular directions.

34. A drive mechanism for chemical mechanical polishing, comprising:

a substrate carrier adapted to hold a substrate against a polishing surface for polishing the substrate, said substrate carrier including a face adapted to contact the substrate;

said substrate carrier being mounted to a support structure; said support structure being adapted to guide linear movements of said substrate carrier along two substantially perpendicular directions;

at least one linear driver associated with said support structure; and a driver associated with said substrate carrier, supported by said support structure and capable of providing a force to at least a portion of said face along a third direction substantially perpendicular to said two substantially perpendicular directions.

35. The drive mechanism of claim 34, further comprising support arms mounted to an exterior of said driver and supported by said support structure.

36. The drive mechanism of claim 35, further comprising:
a support ring mounted to said support structure and connected to said support arms.

37. The drive mechanism of claim 36, further comprising a column interconnecting said substrate carrier and said driver; said column located substantially centrally of said support ring.

38. The drive mechanism of claim 37, further comprising at least one stabilizer connecting said column with said support ring, said at least one stabilizer allowing vertical movements of said column with respect to said support ring and substantially preventing movements of said column in directions perpendicular to vertical with respect to said support ring.

39. The drive mechanism of claim 38, wherein said at least one stabilizer comprises at least one spiral flexure.

40. The drive mechanism of claim 37, further comprising a clamping flexure mounted to said support ring and releasably clamping said column, wherein said column is substantially immovable in said third direction when clamped, but is movable by said driver when unclamped.

41. A drive mechanism for chemical mechanical polishing, comprising:
a substrate carrier adapted to hold a substrate against a polishing surface for polishing the substrate, said substrate carrier including a face adapted to contact the substrate;
said substrate carrier being mounted to a support structure; said support structure being adapted to guide linear movements of said substrate carrier along two substantially perpendicular directions;
at least one linear driver associated with said support structure, said at least one linear driver comprising a plate member and a plurality of magnets separate from said plate member and mounted to said substrate carrier; and
a driver associated with said substrate carrier, said driver adapted to provide a force to at least a portion of said face along a third direction substantially perpendicular to said two substantially perpendicular directions.

42. The drive mechanism of claim 41, wherein said driver comprises said plurality of magnets which provide the force along said third direction by an attractive force generated between said plurality of magnets and said plate member.

43. The drive mechanism of claim 41, wherein said plate member comprises a plurality of projections extending in rows along two substantially perpendicular directions, said projections being selectively energizeable to produce forces between said projections which are energized and magnets, selected from said plurality of magnets, which are aligned with said energized projections.

44. A linear drive mechanism for polishing, comprising:
a substrate carrier having a surface adapted to hold a substrate against a polishing surface for polishing the substrate;
a support structure supporting said substrate carrier and movable to guide linear movements of said substrate carrier along two substantially perpendicular directions;
a driver associated with said substrate carrier and supported by said support structure, said driver adapted to provide a driving force to said substrate carrier along a third direction substantially perpendicular to said two substantially perpendicular directions; and
a clamping flexure mounted to said support structure and releasably fixing said substrate carrier in a position along said third direction, wherein said substrate carrier is substantially immovable in said third direction when fixed by said clamping flexure, but is movable by said driver when released by said clamping flexure.

45. A linear drive mechanism for polishing comprising:
a substrate carrier adapted to hold a substrate against a polishing surface for polishing the substrate;
a plurality of magnets mounted to said substrate carrier; and
a plate member comprising a plurality of projections extending in rows along two substantially perpendicular directions, said projections being selectively energizable to produce forces betweem said projections which are energized and magnets, selected from said plurality of magnets, which are aligned with said energized projections.

46. The linear drive mechanism of claim 45, wherein said substrate carrier comprises a substantially planar face adapted to apply pressure against the substrate during polishing, and wherein said plurality of magnets are mounted peripherally of said substantially planar face.

47. The linear drive mechanism of claim 45, wherein said substrate carrier comprises a substantially planar face adapted to apply pressure against the substrate during polishing, and wherein said plurality of magnets are mounted in and substantially co-planar with said substantially planar face.

48. The linear drive mechanism of claim 45, further comprising, a drive for adjusting a distance of said plurality of magnets from said plate member.

49. The linear drive mechanism of claim 45, further comprising, a polishing pad positioned between said substrate carrier and said plate member, wherein said substrate carrier is controllable to move the substrate against said polishing pad and said plate member to polish the substrate.

50. The linear drive mechanism of claim 49, further comprising an interchange section formed of a portion of said plate member that extends beyond dimensions of said polishing pad, said interchange section having an opening dimensioned slightly larger than the substrate but smaller than said substrate carrier.

* * * * *

UNITED STATES PATENT AND TRADEMARK OFFICE
CERTIFICATE OF CORRECTION

PATENT NO.     : 6,196,896 B1
DATED          : March 6, 2001
INVENTOR(S)    : Phillip R. Sommer It is certified that error appears in the above-identified patent and that said Letters Patent is hereby corrected as shown below:

Column 2,
Line 14, please change "inputted" to -- input --.
Line 16, please add a period after "apparatus".
Line 30, please change "effect" to -- affect --.

Column 3,
Line 58, please change "with said the substrate" to -- with the said substrate --.

Column 8,
Line 15, please change "alternative" to -- alternatively --.
Line 44, please change "parallelly positioned" to -- positioned parallel --.
Line 46, please change "closedtype" to -- closed-type --.
Line 62, please change "portions, 132" to -- portions 132, --.

Column 12,
Line 28, please add -- an -- before "equivalent".
Line 29, please delete the "an" before "planar".

Column 16,
Line 16, please change "place" to -- placed --.

Column 22,
Line 26, please change "betweem" to -- between --.

Signed and Sealed this

Sixth Day of January, 2004

JAMES E. ROGAN
*Director of the United States Patent and Trademark Office*